US012035810B1

(12) United States Patent
Flannery et al.

(10) Patent No.: US 12,035,810 B1
(45) Date of Patent: *Jul. 16, 2024

(54) ONE HAND TWO POINT RELEASE BED RAIL APPARATUS

(71) Applicant: Regalo International, LLC, Longboat Key, FL (US)

(72) Inventors: Mark A. Flannery, Longboat Key, FL (US); Gary T. Schultze, Savage, MN (US)

(73) Assignee: Regalo International, LLC, Longboat Key, FL (US)

( * ) Notice: Subject to any disclaimer, the term of this patent is extended or adjusted under 35 U.S.C. 154(b) by 357 days.

This patent is subject to a terminal disclaimer.

(21) Appl. No.: 17/246,585

(22) Filed: Apr. 30, 2021

Related U.S. Application Data

(63) Continuation of application No. 15/886,797, filed on Feb. 1, 2018, now Pat. No. 10,993,544.

(60) Provisional application No. 62/455,442, filed on Feb. 6, 2017.

(51) Int. Cl.

| | |
|---|---|
| ***A47C 21/08*** | (2006.01) |
| ***A47D 15/00*** | (2006.01) |
| ***A61G 7/05*** | (2006.01) |

(52) U.S. Cl.
CPC ............ *A47C 21/08* (2013.01); *A61G 7/0508* (2016.11); *A47D 15/008* (2013.01)

(58) Field of Classification Search
CPC ....... E05C 9/045; A47C 21/08; A47D 15/008; A61G 7/0508; A61G 7/0509; A61G 7/0518; E05B 53/003; E05B 15/04; E05B 17/0037
USPC .......................................................... 5/81.1 T
See application file for complete search history.

(56) References Cited

U.S. PATENT DOCUMENTS

| | | | | |
|---|---|---|---|---|
| 2,088,665 A * | 8/1937 | Pinson | E05C 9/045 292/37 |
| 4,653,129 A | 3/1987 | Kuck | |
| 7,302,720 B2 | 12/2007 | Flannery et al. | |
| 8,403,374 B2 | 3/2013 | Shimizu | |
| 9,387,141 B1 * | 7/2016 | Flannery | A61G 7/0507 |
| 9,687,081 B1 | 6/2017 | Flannery et al. | |
| 10,993,544 B1 * | 5/2021 | Flannery | A47C 21/08 |
| 2004/0250347 A1 | 12/2004 | Brewin | |
| 2012/0084916 A1 | 4/2012 | Flannery | |
| 2015/0376912 A1 | 12/2015 | Livacich | |

FOREIGN PATENT DOCUMENTS

| | | |
|---|---|---|
| GB | 125834 A | 5/1919 |

* cited by examiner

*Primary Examiner* — Adam C Ortiz

(57) ABSTRACT

A one hand swing down bed rail control having a handle with a rotating portion. The rotating portion draws in the proximal ends of first and second lines that in turn draw in the distal ends of the first and second lines that in turn disengage first and second catches between a frame of the bed rail apparatus and a pair of legs of the bed rail apparatus, where a bed rail of the bed rail apparatus is positioned adjacent to a side of a bed and the legs of the bed rail apparatus extend between a mattress and a mattress support. Once the first and second catches are disengaged, the bed rail may swing down.

5 Claims, 9 Drawing Sheets

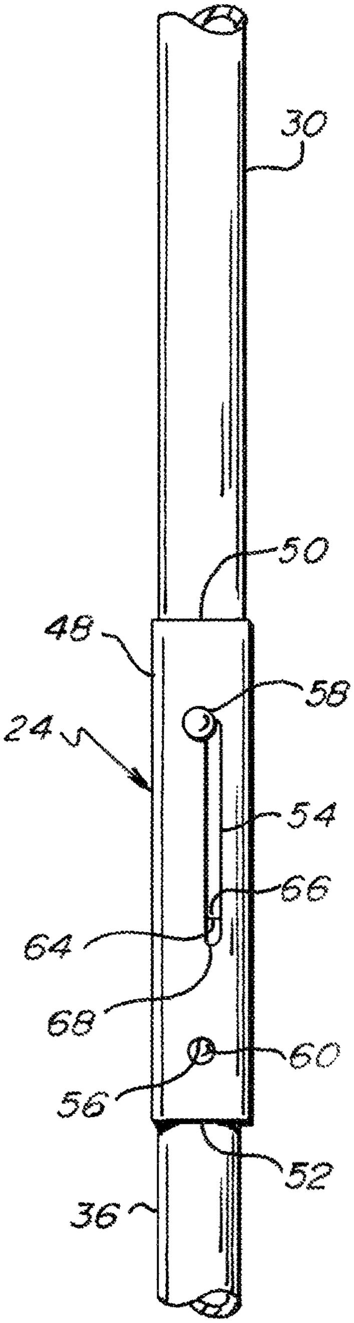
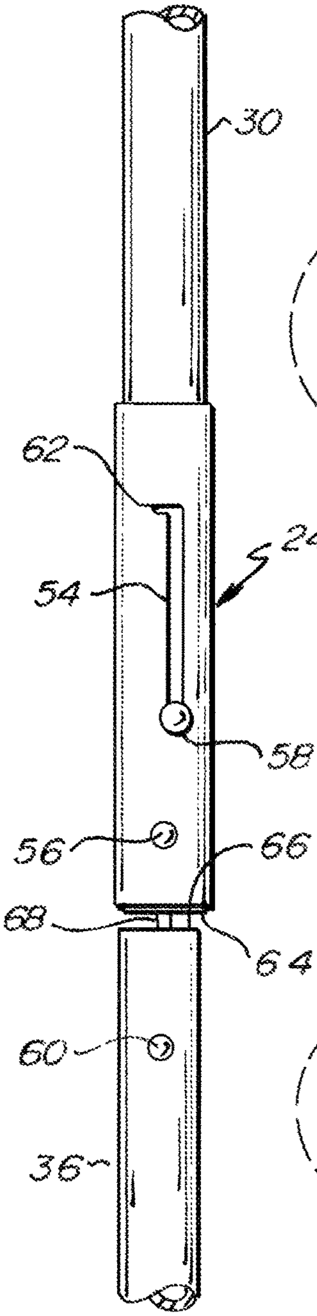
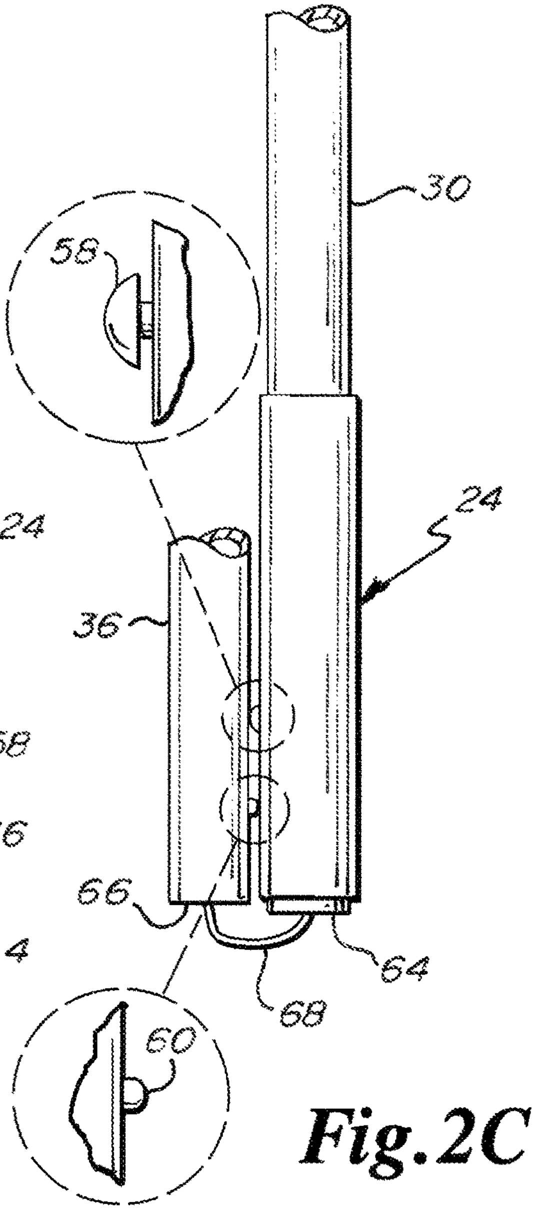
Fig.2C
Fig.2A Fig.2B

ONE HAND TWO POINT RELEASE BED RAIL APPARATUS

This application is a continuation of U.S. patent application Ser. No. 15/886,797 filed Feb. 1, 2018 (U.S. Pat. No. 10,993,544 issued May 4, 2021) and claims the benefit thereof under 35 U.S.C. § 120, which application claims the benefit under 35 U.S.C. 119(e) of U.S. Provisional Patent Application No. 62/455,442 filed Feb. 6, 2017, all of which applications are hereby incorporated by reference in their entireties into this application.

FIELD OF THE INVENTION

The present invention relates to a bed rail apparatus, particularly to a hand control to swing down the bed rail of the bed rail apparatus, and specifically to one hand control that operates a pair of connections that permit the swing down of the bed rail.

BACKGROUND OF THE INVENTION

A bed rail apparatus may include a bed rail positioned adjacent to a side of a bed and first and second legs that extend from the bed rail and between a mattress and mattress support. Conventionally, first and second connections between the first and second legs and the bed rail are manually operated directly at the first and second connections. This manual operation directly at one end of the bed rail must be repeated directly at the other end of the bed rail. If the bed rail is relatively long, the caregiver may have to adjust his or her body position or walk from one end to the other end while holding the bed rail so that the bed rail does not swing down and hit the caregiver. During this operation, the caregiver may also be paying close attention to the child in the bed to ensure that the child does not roll off the soon-to-be-bed-rail-less edge of the bed.

SUMMARY OF THE INVENTION

A feature of the present invention is a one hand two point release bed rail apparatus.

Another feature of the present invention is a one hand two point release bed rail apparatus for engagement to a bed where the bed includes a mattress and mattress support.

Another feature of the present invention is the provision in a one hand two point release bed rail apparatus, of a bed rail, where the bed rail is positioned adjacent to a side of the bed, where the bed rail includes a frame having first and second portions, and where the first portion of the frame extends to a first connection and a second portion of the frame extends to a second connection.

Another feature of the present invention is the provision in a one hand two point release bed rail apparatus, of first and second legs extending between the mattress and mattress support and being engagable and disengageable from the bed rail at two locations.

Another feature of the present invention is the provision in a one hand two point release bed rail apparatus, of first and second catches engaging the first and second legs to the bed rail at first and second locations.

Another feature of the present invention is the provision in a one hand two point release bed rail apparatus, of a handle having first and second ends, where the first end of the handle is engaged to the first portion of the frame of the bed rail, where the first portion of the frame of the bed rail runs from the first end of the handle to the first location, where the second end of the handle is engaged to the second portion of the frame of the bed rail, and where the second portion of the frame of the bed rail runs from the second end of the handle to the second location.

Another feature of the present invention is the provision in a one hand two point release bed rail apparatus, of first and second flexible lines, where each of the first and second flexible lines includes proximal and distal ends, where the first flexible line runs from the first end of the handle, through the first portion of the frame of the bed rail, and to the first location, where the distal end of the first flexible line is engaged to the first catch, where the second flexible line runs from the second end of the handle, through the second portion of the frame of the bed rail, and to the second location, where the distal end of the second flexible line is engaged to the second catch.

Another feature of the present invention is the provision in a one hand two point release bed rail apparatus, of the handle including a rotating portion that operates the proximal ends of the first and second flexible lines that respectively operate the first and second distal ends of the first and second flexible lines to respectively disengage the first and second catches that disengage the bed rail from the first and second legs.

Another feature of the present invention is the provision in a one hand two point release bed rail apparatus, of the bed rail being swingably engaged to the first and second legs, where disengagement of the first and second catches permits the bed rail to swing and remain engaged to the first and second legs.

Another feature of the present invention is the provision in a one hand two point release bed rail apparatus, of the bed rail being disengageable as a whole separate piece from the first and second legs, where disengagement of the first and second catches permits the bed rail to be disengaged as such whole separate piece from the first and second legs.

Another feature of the present invention is the provision in a one hand two point release bed rail apparatus, of the handle including a cam where the cam is engaged to the rotating portion of the handle, and of first and second cam followers where the first and second cam followers engage the cam and further engage the proximal ends of the first and second flexible lines such that rotation of the rotating portion of the handle rotates the cam, which draws in the first and second cam followers, which draw in the proximal ends of the first and second flexible lines, which draw in the distal ends of the first and second flexible lines, which disengage the first and second catches between the bed rail and the first and second legs.

Another feature of the present invention is the provision in a one hand two point release bed rail apparatus, of the handle including first and second riders, where the rotating portion of the handle includes an axis about which the rotating portion rotates, where the rotating portion includes an inner section, where the inner section includes first and second pairs of groove segments disposed obliquely to the axis, where the first and second riders ride in the first and second pairs of groove segments and are drawn in axially when the rotating portion rotates, where the first and second riders are engaged to the proximal ends of the first and second flexible lines.

Another feature of the present invention is the provision in a one hand two point release bed rail apparatus, of the handle including a fixed portion and first and second riders, where the fixed portion includes first and second pairs of slots through which the first and second riders extend, where the rotating portion of the handle rotates about the fixed portion of the handle, where the first and second riders slide in the first and second pairs of slots, where the rotating portion of the handle pushes the first and second riders to slide in an axial and inward direction in the slots as the rotating portion of the handle is rotated, where the first and second riders are engaged to the proximal ends of the first and second flexible lines such that the first and second flexible lines are drawn inwardly as the rotating portion of the handle is rotated.

Another feature of the present invention is the provision in a one hand two point release bed rail apparatus, of the handle including a fixed portion, where the rotating portion of the handle rotates about the fixed portion of the handle, where the fixed portion of the handle includes first and second pairs of slots that are parallel to a rotational axis of the rotating portion of the handle, where the first and second cam followers slide in the first and second pairs of slots, and where the cam pushes the first and second cam followers to slide in an inward and axial direction in the slots as the rotating portion of the handle is rotated.

Another feature of the present invention is the provision in a one hand two point release bed rail apparatus, of the first and second portions of the frame being tubular.

Another feature of the present invention is the provision in a one hand two point release bed rail apparatus, of the handle including a fixed portion, where the rotating portion of the handle rotates about the fixed portion of the handle and about a rotational axis, where the fixed portion of the handle includes a fixed stop, where the rotating portion of the handle includes a slide lock that slides parallel to the axis, where the slide lock includes a thumb extension on an exterior of the rotating portion and an interior stop, where the interior stop includes a first position adjacent the fixed stop where the fixed stop confronts the interior stop and prevents rotation of the interior stop about the rotational axis, where the interior stop includes a second position beyond the fixed stop and is slideable in an axial direction from the first position to the second position, where the interior stop is rotatable about the rotational axis when in the second portion such that the interior stop may rotate past the fixed stop and such that the rotating portion of the handle may rotate when the interior stop is in the second position.

Another feature of the present invention is the provision in a one hand two point release bed rail apparatus, of each of the first and second catches including a closed position and an open position, where each of the first and second catches includes a normal bias from the open position to the closed position, and where, in returning from the open position to the closed position under the normal bias, the first and second catches operate the distal ends of the first and second flexible lines that operate the proximal ends of the first and second flexible lines that rotate the rotating portion to return the rotating portion of the handle to an original position.

Another feature of the present invention is the provision in a one hand two point release bed rail apparatus, of normal bias of the first and second catches being provided, respectively, by first and second springs at the first and second locations.

Another feature of the present invention is the provision in a one hand two point release bed rail apparatus, of each of the first and second catches including a closed position and an open position, where each of the first and second catches includes a normal bias from the open position to the closed position, and where, in returning from the open position to the closed position under the normal bias, the first and second catches draw out the distal ends of the first and second flexible lines, which draws out the proximal ends of the first and second flexible lines, which draws out the first and second cam followers, which rotate the rotating portion of the handle back to the original position.

Another feature of the present invention is the provision in a one hand two point release bed rail apparatus, of a cylindrical connector having two ends, where the first portion of the frame includes first and second sections, where the first section includes a distal cylindrical segment terminating in a distal end face, where the second section includes a proximal cylindrical segment terminating in a proximal end face, where the end faces of each of the first and second sections are face to face and adjacent to each other when the cylindrical connector is engaged to the cylindrical segments such that the first and second sections are fixed relative to each other, and where the first and second sections of the first portion of the frame are disposable side to side relative to each other when one of the ends of the cylindrical connector is slid axially past one of the end faces.

Another feature of the present invention is the provision in a one hand two point release bed rail apparatus, of the cylindrical connector including a slot having an axially extending portion and a circumferentially extending portion, and of one of the cylindrical segments including a pin, where the cylindrical connector is locked against axially sliding when the pin is in the circumferentially extending portion, and where the cylindrical connector is axially slideable when the pin is in the axially extending portion of the slot.

Another feature of the present invention is a one hand cam apparatus.

Another feature of the present invention is the provision in a one hand cam apparatus, of a handle where the handle includes a fixed portion and a rotating portion rotatable about an axis, where the fixed portion includes first and second ends and an intermediate section between the first and second ends, and where the rotating portion is between the first and second ends and rotating about the intermediate section.

Another feature of the present invention is the provision in a one hand cam apparatus, of a cam where the cam is engaged to the rotating portion of the handle.

Another feature of the present invention is the provision in a one hand cam apparatus, of first and second cam followers engaging the cam.

Another feature of the present invention is the provision in a one hand cam apparatus, of first and second elements engaged to the first and second cam followers and extending out of the first and second ends of the fixed portion of the handle.

Another feature of the present invention is the provision in a one hand cam apparatus, of the rotating portion of the handle rotating the cam to draw in the first and second cam followers to draw in the first and second elements such that the one hand cam apparatus may control first and second operations outside of the handle with one hand rotation of the rotating portion of the handle.

Another feature of the present invention is the provision in a one hand cam apparatus, of the rotating portion of the handle including an inner section, where the inner section includes first and second pairs of groove segments disposed obliquely to the axis, where the first and second cam followers are respectively engaged in the first and second pairs of groove segments, and where the first and second cam followers are drawn toward each other when the rotating portion rotates.

Another feature of the present invention is the provision in a one hand cam apparatus, of the fixed portion of the handle including first and second pairs of slots through which the first and second cam followers respectively radially extend and along which the first and second cam followers axially slide, and where the cam of the rotating portion of the handle pushes the first and second cam followers to slide in an axial and inward direction in the slots as the rotating portion of the handle is rotated.

Another feature of the present invention is the provision in a one hand two point release bed rail apparatus, of a junction and frame section combination in the frame of the bed rail of the bed rail apparatus.

Another feature of the present invention is the provision in a one hand two point release bed rail apparatus, of the frame of the bed rail including a first tubular frame section and a second tubular frame section, where the first tubular frame section includes a distal cylindrical segment terminating in a distal end face, where the second tubular frame section includes a proximal cylindrical segment terminating in a proximal end face.

Another feature of the present invention is the provision in a one hand two point release bed rail apparatus, of the frame of the bed rail including a cylindrical connector, where the cylindrical connector is engagable to each of the distal and proximal cylindrical segments.

Another feature of the present invention is the provision in a one hand two point release bed rail apparatus, of the frame of the bed rail including a cylindrical connector that includes a slot having an axially extending portion and a circumferentially extending portion, where one of the cylindrical segments includes a pin, where the end faces of each of the first and second sections are face to face and adjacent to each other when the cylindrical connector is engaged to the cylindrical segments such that the first and second tubular frame sections are fixed relative to each other, where the first and second tubular frame sections may be disposed side to side relative to each other when one of the ends of the cylindrical connector is slid axially past one of the end faces, where the cylindrical connector is locked against axially sliding when the pin is in the circumferentially extending portion, and where the cylindrical connector is axially slideable when the pin is in the axially extending portion of the slot.

Another feature of the present invention is the provision in a one hand two point release bed rail apparatus, of the frame of the bed rail including a flexible line extending from the first tubular frame section to the second tubular frame section where the flexible line extends through the end faces.

An advantage of the present invention is that one hand may be kept on the child in the bed to prevent the child from rolling off the bed while the other hand operates the bed rail to swing down or swing up the bed rail. One feature contributing to this advantage is that one twist of one handle operates at the same time two points of connection between the bed rail and the legs of the bed rail.

Another advantage of the present invention is that the lock on the handle to prevent rotation may be operated with the thumb of the hand that rotates the handle.

Another advantage of the present invention is that an unintended swinging of the bed rail, or a swinging of the bed rail by a child, is minimized by requiring two operations to occur at the same time. These two operations are a sliding of the thumb lock and a twisting of the handle. After the thumb lock is slid inwardly to an open position and while the thumb lock is held at the inner unlocked and open position, the handle can be rotated. If the thumb lock is released prior to the handle being rotated, the normal bias of the thumb lock returns the thumb lock from the inner open position to the outer locked position, whereupon the handle is prevented from rotation and the bed rail stays upright.

Another advantage of the present invention is that the bed rail may be folded for storage. One feature contributing to this advantage is that, at frame locations through which the flexible line extends and at which the frame folds, frame end sections are adjacent to each other face to face without one frame end section extending into the other frame section. Another feature contributing to this advantage is that the cylindrical elongate connector engages an elongate distal section of one frame end section and an elongate proximal section of the adjacent frame end section.

Another advantage of the present invention is that the bed rail is inexpensive to manufacture.

Another advantage of the present invention is that the bed rail is simple to use.

BRIEF DESCRIPTION OF THE DRAWINGS

FIG. 2A is a front view of a connector for two abutting frame end portions of the bed rail frame of the bed rail apparatus of FIG. 1A, where the connector is engaged to the two abutting frame end portions.

FIG. 2B is a front view of the connector and frame end portions of FIG. 2A, where the connector has been slid away from the abutment between the two frame end portions and where the two frame end portions have been slightly drawn away from each other.

FIG. 2C is a side view of the connector and frame end portions of FIG. 2A, where the connector has been slid away from the abutment between the two frame end portions and where the frame end portions have been folded upon each other.

DESCRIPTION

Figure 1A:
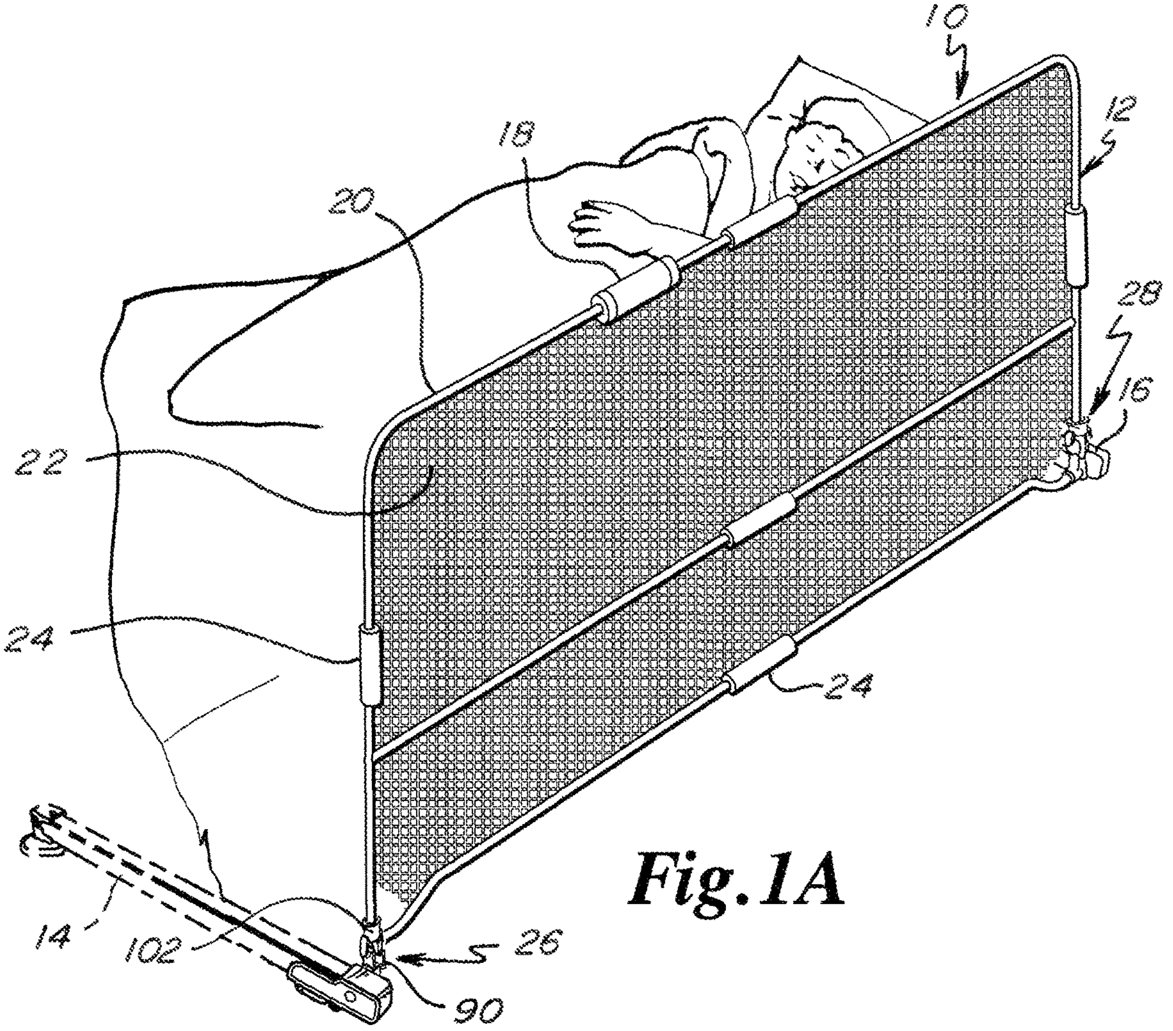
FIG. 1A is a perspective view of the present one hand two point release bed rail apparatus.
Figure 1B:
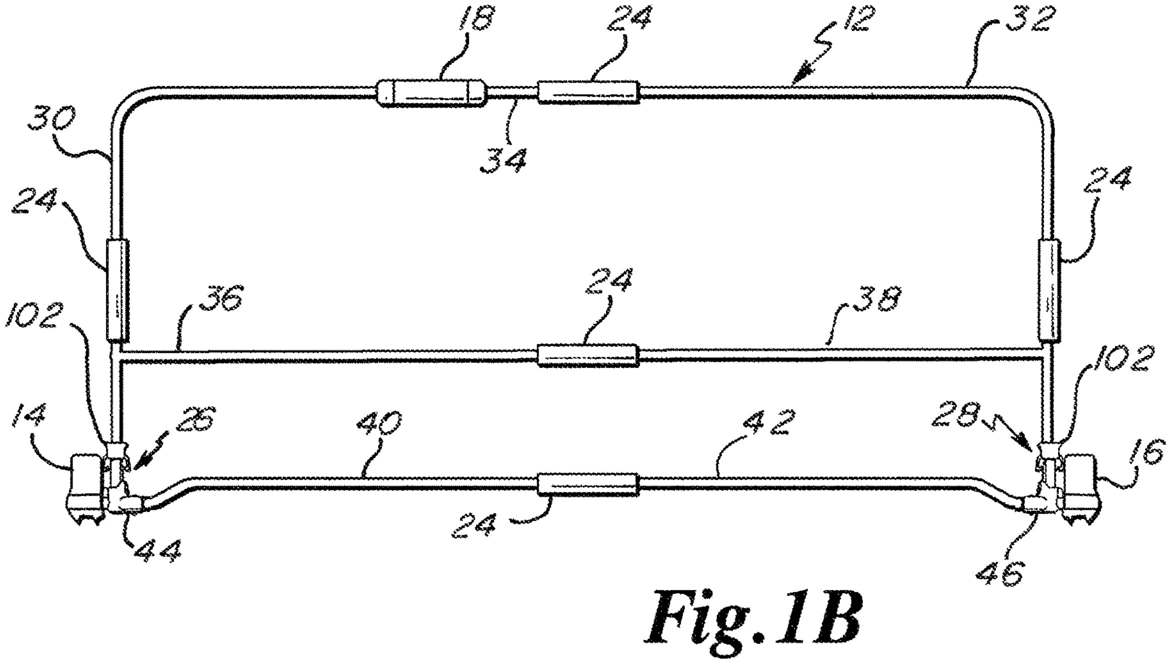
FIG. 1B is a front view of the frame of the bed rail apparatus of FIG. 1.

As shown in FIG. 1, the present one hand two point release bed rail apparatus is indicated by reference number 10. The bed rail apparatus 10 includes a bed rail 12, a first leg 14 and a second leg 16. Bed rail 12 includes a handle 18, a bed rail frame 20, and sheeting 22. The bed rail frame 20 includes connecting tubes or connectors 24. The bed rail apparatus 10 further includes a first junction 26 between the bed rail frame 20 and the first leg 14 and a second junction 28 between the bed rail frame 20 and the second leg 16. First and second junctions 26, 28 are mirror images of each other but identical in all other respects.

Sheeting 22 is flexible material but is taut when engaged to the bed rail frame 20. Sheeting 22 may be a mesh material or another fabric or textile material that is not a mesh. Sheeting 22 may be part mesh and part non-mesh. Sheeting 22 may be engaged in a removable manner to the bed rail frame 20. Sheeting 22 may be engaged to a fixed or nonrotating portion of the handle 18 and is preferably not engaged to the rotating portion of the handle 18. Sheeting 22 is preferably not engaged to any of the connectors 24 because the connectors 24 slide on portions of the bed rail frame 20. Sheeting 22 is preferably not engaged to the junctions 26, 28 or the portions of the junctions 26, 28 that slide or pivot. Sheeting 22 may be engaged to portions of the junctions 26, 28 that are fixed relative to the bed rail frame 20. Sheeting 22 may be engaged or removably engaged to fixed portions of the bed rail frame 20, including the uppermost, intermediate and lowermost tubular segments or sections and the side or end tubular segments or sections to which the connector 24 is not engaged, to which the connector 24 will not slide, to which portions of the junctions 26, 28 are not engaged, and to which portions of the junctions 26, 28 will not slide.

Bed rail frame 20 includes a plurality of tubular sections. These tubular sections include a left L-shaped tubular section 30, a right L-shaped tubular section 32, an uppermost straight tubular section 34, a left T-shaped intermediate tubular section 36, a right T-shaped intermediate tubular section 38, a left bottommost generally horizontal tubular section 40, and a right bottommost generally horizontal tubular section 42.

Left tubular section 30 includes a horizontal segment and a vertical segment so as to be L-shaped. The horizontal segment engages the handle 18. The vertical segment is engaged by a vertical connector 24 and inside the connector 24 the bottom end of the vertical segment is adjacent to an end of a vertical segment of T-shaped tubular section 36.

Right tubular section 32 includes a horizontal segment and a vertical segment so as to be L-shaped. The horizontal segment engages a horizontal connector 24. The vertical segment is engaged by a vertical connector 24 and inside the connector the bottom end of the vertical segment is adjacent to an end of a vertical segment of T-shaped tubular section 38.

One end of uppermost straight tubular section 34 is engaged to an end of handle 18 opposite the end to which tubular section 30 is engaged. The other end of uppermost straight tubular section 34 is engaged by a connector 24 and is adjacent to an end of the horizontal segment of right L-shaped tubular section 32.

Left T-shaped intermediate tubular section 36 includes a horizontal segment and a vertical segment. The horizontal segment extends from between upper and lower ends of the vertical segment such that tubular section 36 takes a T-shape form. One end of the horizontal segment is engaged by a horizontal connector 24 and is adjacent to an end of the horizontal segment of right T-shaped intermediate tubular section 38. The other end of the horizontal segment is engaged to a vertical segment between the upper and lower ends of the vertical segment. The upper end of the vertical segment is engaged by a vertical connector 24 and is adjacent to an end of the vertical segment of left L-shaped tubular section 30. The lower end of the vertical segment is engaged to a joint 44 to which an end of bottommost generally horizontal tubular section 40 is also engaged.

Right T-shaped intermediate tubular section 38 includes a horizontal segment and a vertical segment. The horizontal segment extends from between upper and lower ends of the vertical segment such that tubular section 38 takes a T-shape form. One end of the horizontal segment is engaged by a horizontal connector 24 and is adjacent to an end of the horizontal segment of left T-shaped intermediate tubular section 36. The other end of the horizontal segment is engaged to a vertical segment between the upper and lower ends of the vertical segment. The upper end of the vertical segment is engaged by a vertical connector 24 and is adjacent to an end of the vertical segment of right L-shaped tubular section 32. The lower end of the vertical segment is engaged to a joint 46 to which an end of bottommost generally horizontal tubular section 42 is also engaged.

Left bottommost generally horizontal tubular section 40 includes an end that is engaged in joint 44 and that is adjacent to the lower end of the vertical segment of the left T-shaped intermediate tubular section 36. The other end of the left bottommost generally horizontal tubular section 40 is engaged in a horizontal connector 24 and is adjacent to an inner end of the right bottommost generally horizontal tubular section 42.

Right bottommost generally horizontal tubular section 42 includes an end that is engaged in joint 46 and that is adjacent to the lower end of the vertical segment of the right T-shaped intermediate tubular section 38. The other end of the right bottommost generally horizontal tubular section 42 is engaged in a horizontal connector 24 and is adjacent to an inner end of the left bottommost generally horizontal tubular section 40.

The ends of the tubular sections 30, 32, 34, 36, 38, 42 that are adjacent to each other in connectors 24 may abut each other or be slightly spaced from each other when in the connector 24. Elongate portions of the tubular sections 30, 32, 34, 36, 38, 40 and 42 are engaged by the elongate connectors 24 so as to maximize surface area support between the tubular sections 30, 32, 34, 36, 38, 40, 42 and the elongate connector 24 so as to maximize rigidity to the bed rail frame 20 as a whole. The end portions, such as proximal and distal end portions, of the tubular sections 32, 34, 36, 38, 40 and 42 are cylindrical and have an outside diameter about equal to the inside diameter of the cylindrical connector 24 such that there is a friction slide fit between the tubular sections 30, 32, 34, 36, 38, 40, 42 and the connectors 24.

The connector 24 is shown in detail in FIGS. 2A, 2B and 2C. Connector 24 includes an elongate cylindrical body 48 having first and second annular ends or annular end faces 52. Connector 24 further includes an elongate L-shaped slot 54 and a button opening 56. The elongate L-shaped slot 54 includes an axially extending portion or relatively long portion and a circumferentially extending portion or relatively short portion. The connector 24 shown in FIGS. 2A, 2B and 2C is the connector 24 that is engaged between tubular sections 30 and 36 or, more specifically, between the vertical segment of tubular section 30 and the upper vertical segment of tubular section 36.

The elongate L-shaped slot 54 is engaged by a fixed button 58 having a head and a stem or pin. The head of the fixed button 58 is greater in width than the slot 54 and the stem of the fixed button 58 has a width less than the width of the slot 54. Fixed button 58 is fixed to the vertical segment of tubular section 30. The head of the fixed button 58 is spaced from the cylindrical surface of the vertical segment to provide space for the body 48 of the connector 24.

The button opening 56 is engaged by a depressible button 60 that is engaged inside the vertical segment of tubular section 36 and extends from the inside of the vertical segment of tubular section 36 to the outside of the vertical segment of tubular section 36. Button 60 extends sufficiently far beyond the outside surface of the vertical segment of tubular section 36 so as to work as a stop when engaged in button opening 56 of connector 24. The part of the button 60 that extends beyond the outside surface of the vertical segment of tubular section 36 may include in part a cylindrical portion and in part an spherical portion. The depressible button 60 is spring based, such as with the U-shaped spring shown in FIGS. 9B and 9C.

FIG. 2A shows the connector 24 engaging tubular sections 30, 36 so as to hold the tubular sections 30, 36 rigid relative to each other. In other words, with connector 24 fixed in place where fixed button 58 is seated in seat 62 or short leg 62 of the circumferentially extending portion of slot 54 and where depressible button 60 is engaged in button hole 56, there is no rotation or spin between tubular sections 30, 36 and no axial movement or angular movement or pivoting movement between tubular sections 30, 36. When connector 24 is engaged to tubular sections 30, 36, a tubular annular end face 64 of tubular section 30 is adjacent to and may abut a tubular annular end face 66 of tubular section 36.

FIG. 2B shows disengagement of connector 24. To disengage connector 24, two actions are required. First, button 60 is depressed. Then, while holding button 60 down, the connector 24 is rotated to unseat fixed button 58 from seat 62 so as to align the stem of fixed button 58 with the long and vertical axial section of slot 54. Then connector 24 is slid away from tubular section 36 such that the stem of fixed button 58 guides the sliding of the connector 24 away from tubular section 36 until a distal seat 68 of the axially extending portion of slot 54 hits the stem of the fixed button 58. During this sliding step, end 52 of the connector 24 passes over the abutment or near abutment of ends 64, 66. End 52 may come to rest slightly inwardly of end 64 of tubular section 30.

FIG. 2C shows that after disengagement of the connector 24, tubular sections 30, 36 may be folded on top of one another, or be disposed side to side of one another, so as to reduce the amount of space taken up by the bed rail apparatus 10. In such a folded position, the axis of the vertical segment of tubular section 36 is parallel to the axis of the vertical segment of tubular section 30.

To engage connector 24, the annular end face 66 of upper vertical segment of tubular section 36 is brought end to end with the annular end face 64 of the vertical segment of tubular section 30. Then the connector 24 is slid toward end face 66, over the abutment of end faces 64, 66, over button 60 which is depressed with a finger, to a location where the stem of fixed button 58 hits the proximal end of the long axial portion of slot 54, whereupon the connector 24 is rotated to bring the seat 62 to the stem of the fixed button 58, whereupon the button 60 pops into the button hole 56 at the same time that the stem of the fixed button 58 is seated in the seat 62.

Tubular sections 30, 36 are shown in FIGS. 2A, 2B and 2C. A first flexible line 68 is shown in FIGS. 2B and 2C. This flexible line 68 runs from handle 18 to first junction 26 and, in doing so, extends through 1) the horizontal segment of tubular section 30, 2) the vertical segment of tubular section 30, and 3) the upper and lower vertical segments of tubular section 36. A second flexible line 70 runs from handle 18 to second junction 28 and, in doing so, extends through 1) the horizontal segment of tubular section 32, 2) the vertical segment of tubular section 32, and 3) the upper and lower vertical segments of tubular section 38.

The bed rail frame 20 may be folded along a horizontal fold line or horizontal axis when two connectors 24 are disengaged. These two connectors 24 are the connectors 24 on the vertically extending rail segments of the bed rail frame 20, namely, 1) the connector 24 between the vertical segments of tubular sections 30 and 36 and 2) the connector 24 between the vertical segments of tubular sections 32 and 38. When so folded, an upper portion of the bed rail 12 may be face to face with a lower portion of the bed rail 12.

The bed rail frame 20 may fold along a vertical fold line or vertical axis when three connectors 24 are disengaged. These three connectors are 1) the connector 24 between horizontal tubular section 34 and the horizontal segment of tubular section 32, 2) the connector 24 between the horizontal segments of tubular sections 36 and 38, and 3) the connector 24 between the generally horizontal tubular sections 40, 42. When so folded, a right half portion of the bed rail 12 may be face to face with a left half portion of the bed rail 12.

The bed rail frame 20 may be folded along the vertical fold line and then along the horizontal fold line. The bed rail frame 20 may be folded along the horizontal fold line and then along the vertical fold line.

Figure 3:
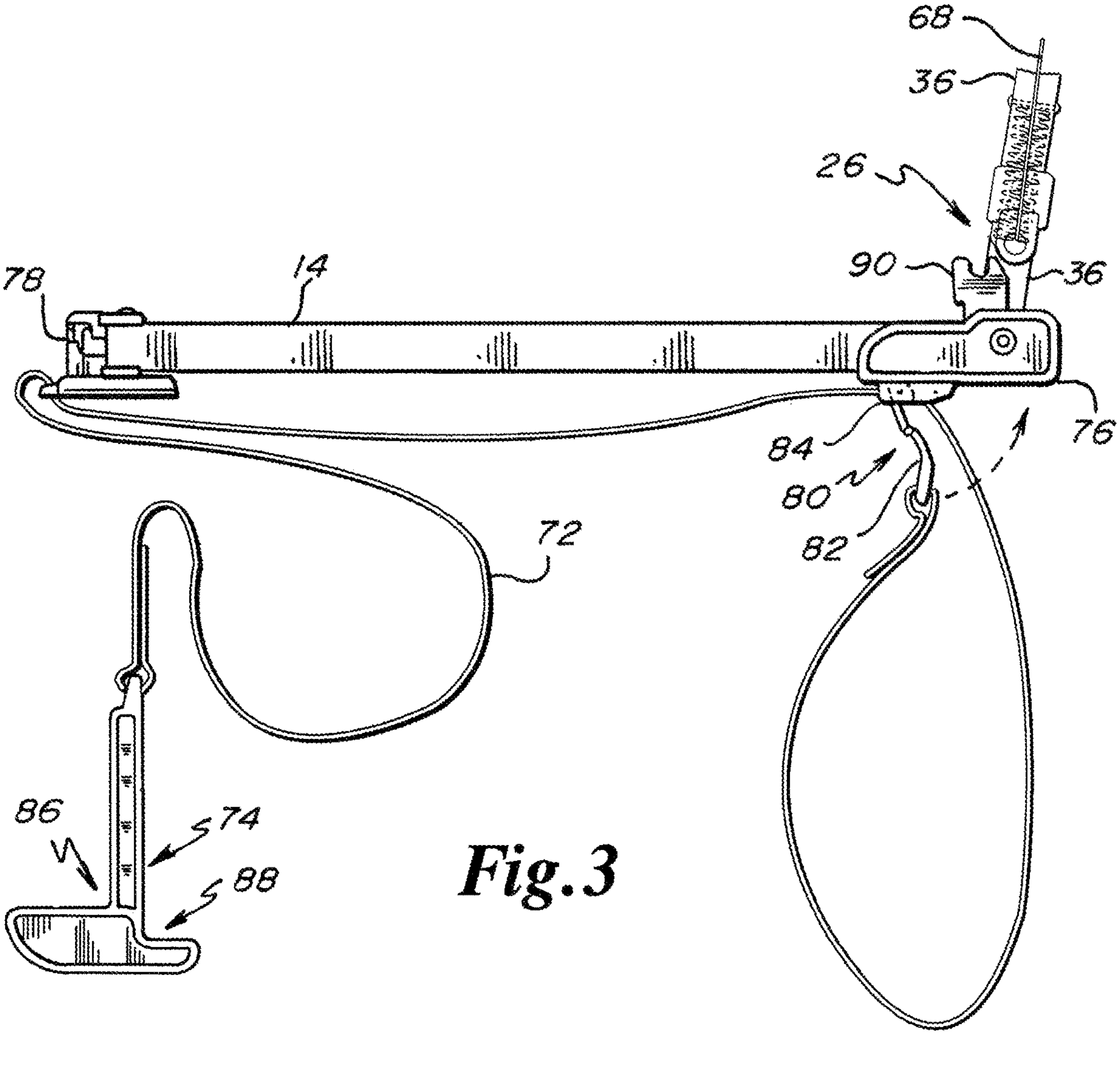
FIG. 3 is a side partial view of the bed rail apparatus of FIG. 1A and further shows a side view of a counter member that engages the far side of one or both of the mattress and mattress support.
Figure 4B:
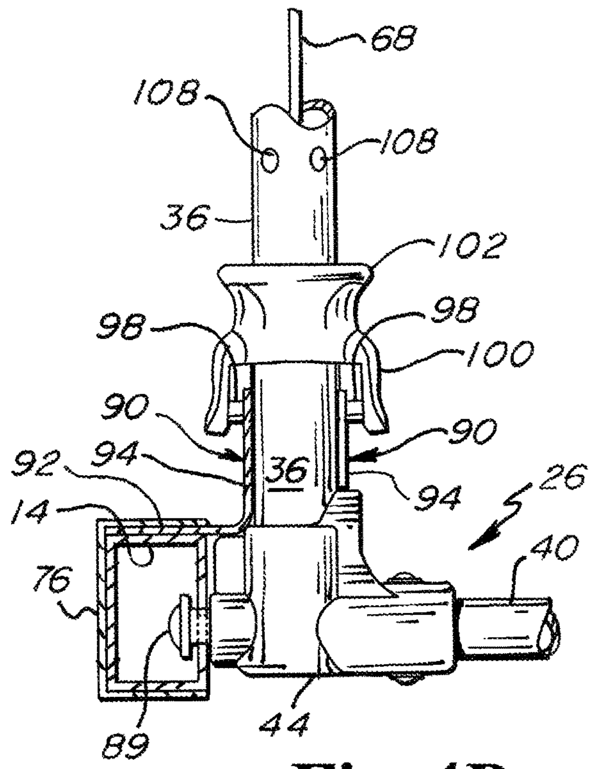
FIG. 4B is a front partially section view of the junction of FIG. 4A.
Figure 4A:
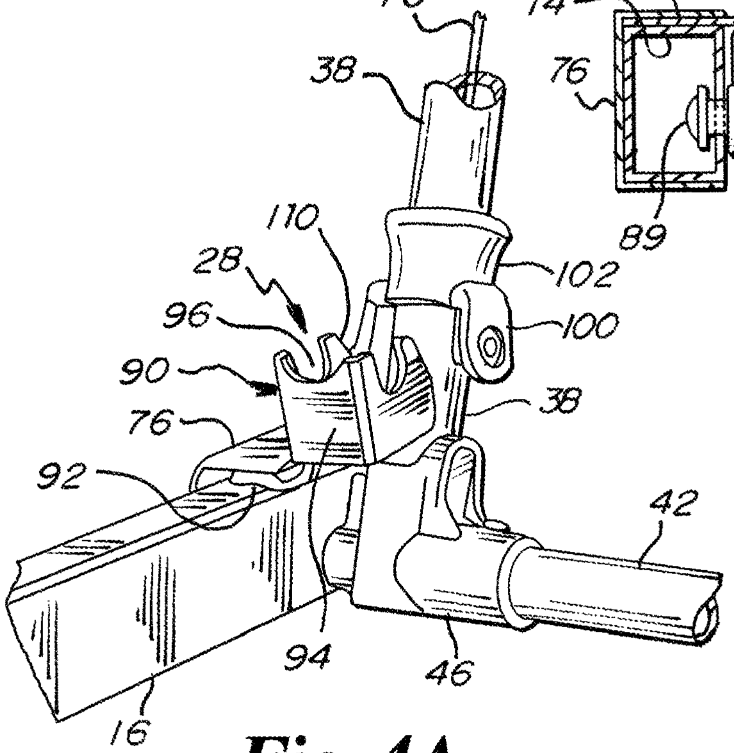
FIG. 4A is a rear perspective view of a junction between the bed rail of the bed rail apparatus of FIG. 1A and a mount fixed to a leg of the bed rail apparatus.
Figure 4C:
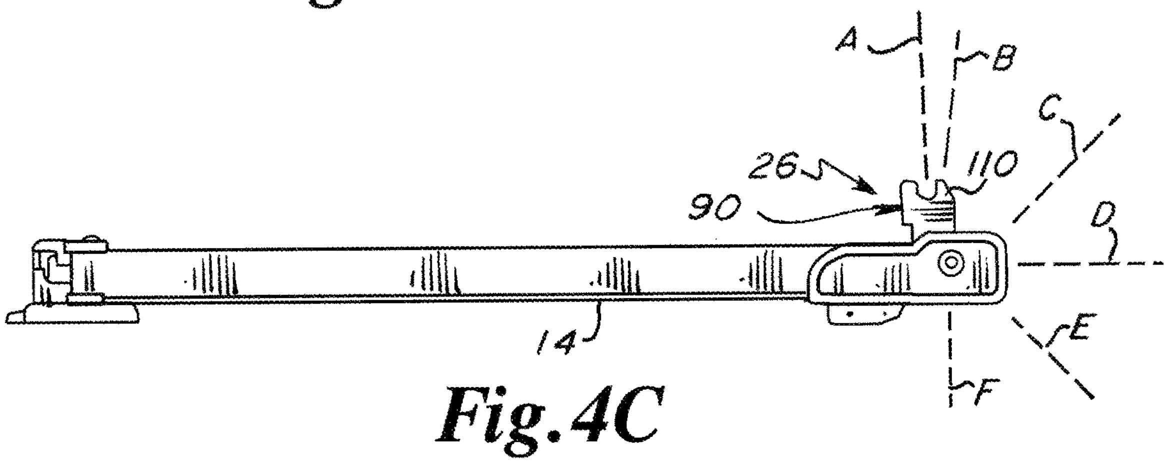
FIG. 4C is a side diagrammatic view of a portion of a leg of the bed rail apparatus of FIG. 1A and a fixed mount for the bed rail of the bed rail apparatus, showing a range of swing for the bed rail of the bed rail apparatus from an engaged position.
Figure 5A:
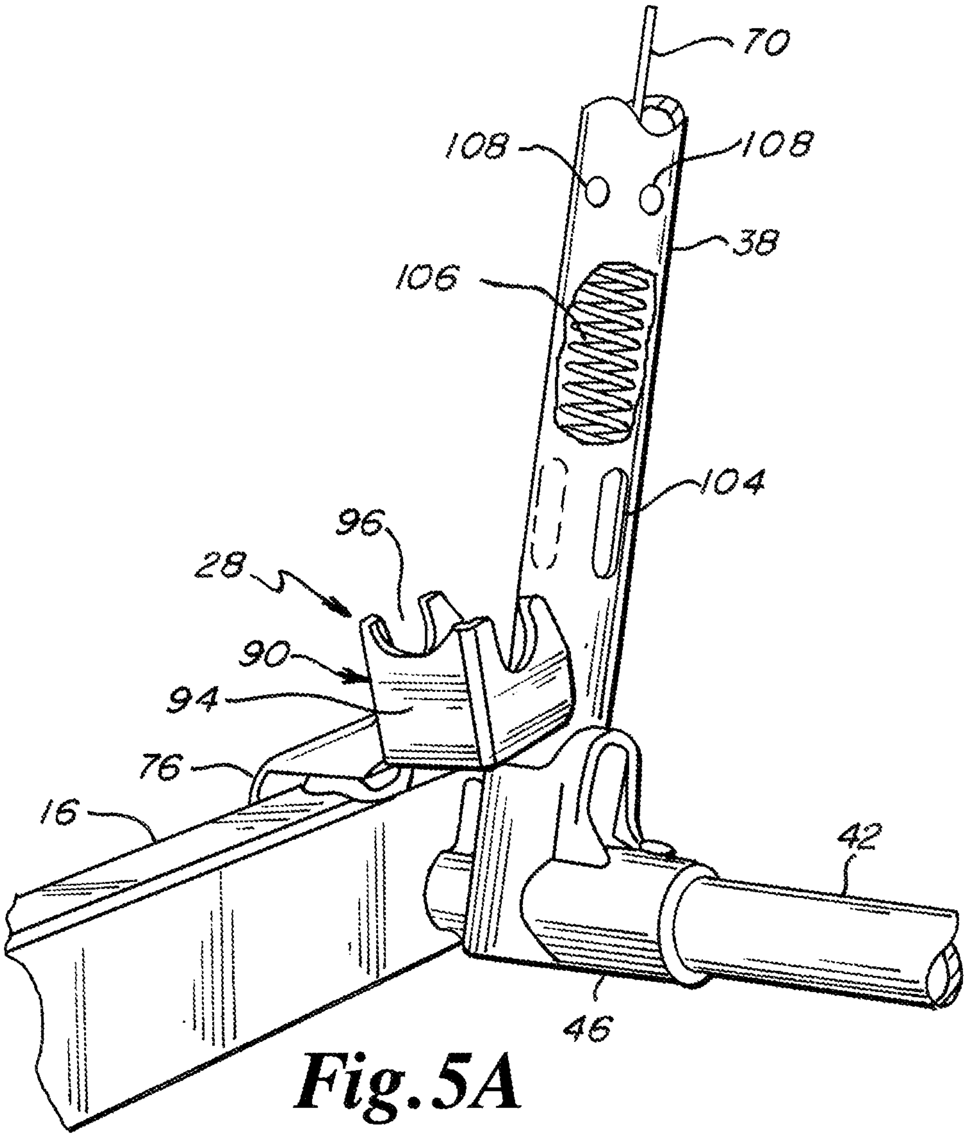
FIG. 5A is a rear perspective partially section view of a junction between the bed rail of the bed rail apparatus of FIG. 1A and a mount fixed to a leg of the bed rail apparatus where a part of the bed rail catch portion has been removed.
Figure 5B:
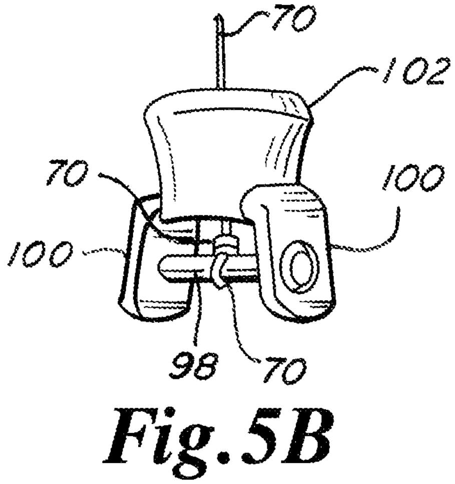
FIG. 5B is an isolated perspective view of the part of the bed rail catch portion that has been removed from FIG. 5A, yet still shows the flexible line of FIG. 5A, and does not show the coil spring of FIG. 5A that axially surrounds the flexible line.

FIG. 3 shows a side view of the base support or leg 14, strap 72 and counter member 74. FIG. 3 further shows a proximal plastic piece 76 on one end of the base support or leg 14 and a distal plastic piece 78 on the other end of the base support or leg 14. FIG. 3 further shows a pincher mechanism 80 having a lever 82 engaged between lower sides 84 of proximal plastic piece 76. FIG. 3 shows that the counter member includes a first L-shaped cut out region 86 for confronting the underside of the mattress of a bed and the far side of the mattress and a second L-shaped cut out region 88 for confronting the upper side of a mattress support such as a box spring and the far side of a mattress support such as a box spring. Counter member 74 is rigid. Strap 72 is flexible. Pincher mechanism 80 and its lever 82 are employed to fix the counter member 74 at different distances from bed rail 12. FIG. 3 further shows leg mount 90, which is a leg catch portion that engages the bed rail catch portion. Leg mount 90 is a rigid piece that rigidly extends from, or can be described as being part of, the leg 14. Leg mount 90 is also a near side counter member such that the leg assembly, or leg 14, strap 72 and counter member 74, engage the mattress on each of the near and far sides of the mattress. As to the base support or leg 14, strap 72, counter member 74, proximal plastic piece 76, distal plastic piece 78, pincher mechanism 80, lever 82, lower sides 84, regions 86 and 88, leg mount 90, and sheeting 22, the Flannery et al. U.S. Pat. No. 9,387,141 B1 issued Jul. 12, 2016 is hereby incorporated by reference in its entirety.

FIGS. 4A, 4B, 4C and 5A show the leg mount 90. FIGS. 4A, 4B, 4C, 5A, and 5B show portions of the junctions 26, and 28 between the bed rail 12 and the leg 14. Each of the junctions 26, 28 includes a pivoting portion and a locking portion. When the locking portion is disengaged, the bed rail 12 is still engaged, albeit swingably, to the bed rail apparatus 10 through the pivoting portion.

The pivoting portion of the bed rail apparatus 10 includes a pivot pin 89 extending from each of the outer ends of left and right bottommost horizontal tubular support members 40, 42. Pivot pins 89 engage respective legs 14, 16. Each of the legs 14, 16 is a tubular member. Pivot pins 89 are shown to engage only the inner wall of the tubular member of the legs 14, 16 but may extend through both upright outer and inner walls of the tubular member of legs 14, 16 if desired. Tubular member of legs 14, 16 is rectangular in section.

The locking portion of junctions 26, 28 of the bed rail apparatus 10 includes leg mount 90. Leg mount 90 is preferably a rigid piece welded to the metal leg 14. Leg mount 90 includes a base 92 welded to the metal leg 14 and a box like piece 94 welded to the base 92. Box like piece 94 includes a pair of opposing seats 96 and an open front side that permits the reception into the box like piece of the vertical segments of T-shaped tubular sections 36, 38 of the bed rail frame 20. Opposing seats 96 cooperate with a pin 98. Pin 98 is engaged to and between a pair of ears 100 that depend from a collar or annular slide 102. Each of the pins 98 in each of the junctions 26, 28 has a pair of heads on the exterior of the ears 100. Collar 102 has an inside diameter that is about equal to the outside diameter of each of the vertical segments of T-shaped tubular sections 36, 38. Pin 98 extends through a pair of slots 104 formed diametrically opposite of each other in each of the vertical segments of T-shaped tubular sections 36, 38. Pin 98 is normally biased to a closed position by a coil spring 106 that is engaged between the sliding pin 98 and a pair of fixed pins 108. One pair of fixed pins 108 is diametrically engaged to each of the vertical segments of T-shaped tubular sections 36, 38. Each of the flexible lines 68, 70 is engaged to a respective sliding pin 98 in each of the respective junctions 26, 28 and extends between a pair of fixed pins 108. Flexible lines 68, 70 may extend generally axially through the respective coil spring 106 and between the fixed pins 108. When the rotating portion of handle 18 is rotated, flexible lines 68, 70 are drawn in, which draw up pin 98 to unseat the pins 98 from seats 96 and leg mount which permits the bed rail 12 to pivot through the range of angles A, B, C, D, E and F shown in FIG. 4C. Angle A shows the seated position of the bed rail 12 and Angle F is the depending, swung down, at rest, gravity induced, vertical position of the bed rail 12. The range is slightly over 180 degrees because bed rail 12 is disposed at an acute angle (an angle less than 90 degrees) relative to an axis of the leg 14 so as to minimize gaps that may otherwise form between the near side of the mattress of the bed and the bed rail 12. The leg mount 90 has a pair oblique guide surfaces 110 that automatically urge or push pin 98 upwardly against the bias of the coil spring 106 such that the pin 98 automatically snaps into the seats 96 of the leg mount 90 without operating the rotating portion of the handle 18 when the bed rail 12 is swung up to the operating position against the near side of the bed.

Figure 6A:
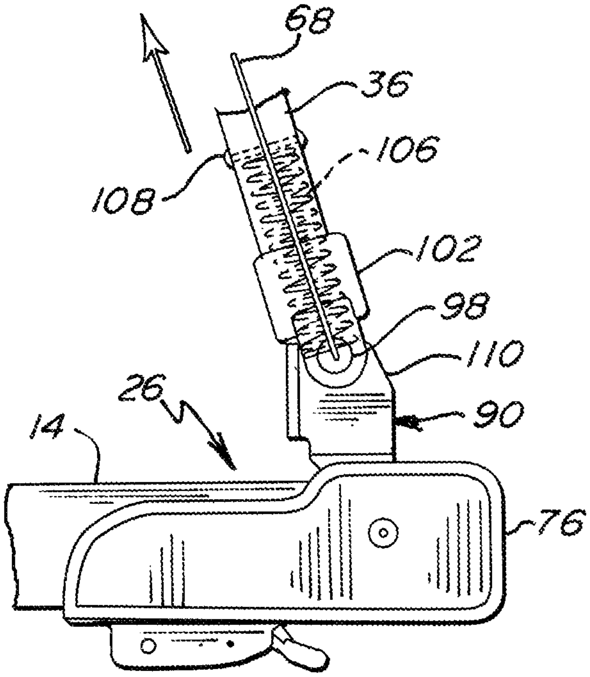
FIG. 6A is a side view of the junction of FIG. 4A between the bed rail of the bed rail apparatus and a mount fixed to a leg of the bed rail apparatus, where the bed rail catch portion is seated in the mount.
Figure 6B:
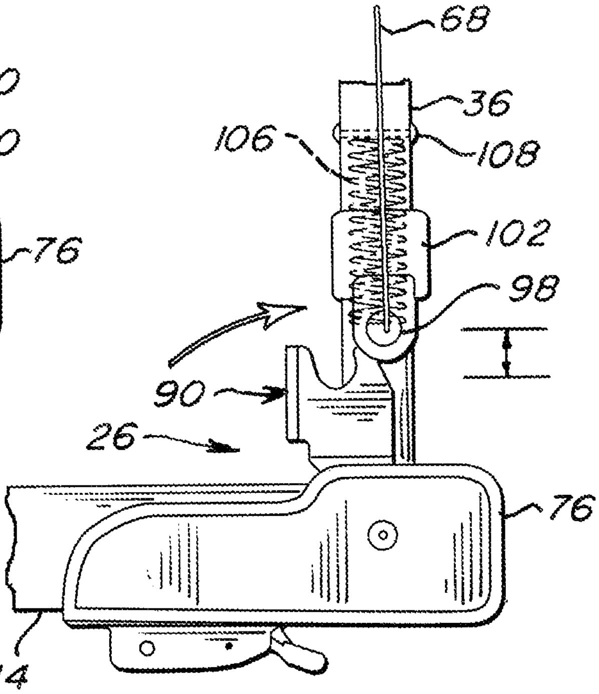
FIG. 6B is a side view of the junction of FIG. 6A, where the bed rail catch portion has been disengaged from the leg mount, where the bed rail has been slightly swung away from the side of the bed, and where the bed rail catch portion is under tension from the handle being rotated.
Figure 6C:
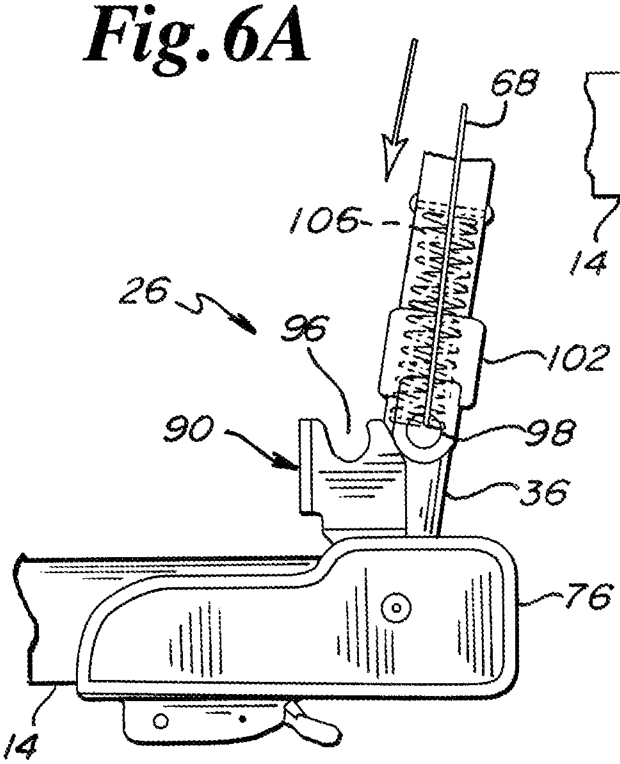
FIG. 6C is a side view of the junction of FIG. 5A, where the bed rail catch portion has been disengaged from the leg mount, where the bed rail has been further swung away from the side of the bed, and where the bed rail catch portion is no longer under tension from the handle.

FIG. 6A is a side view of the junction 26 between the bed rail 12 of the bed rail apparatus 10 and the leg mount fixed to the leg 14 of the bed rail apparatus 10, where the pin 98 or bed rail catch portion 98 is seated in the leg catch portion 90 or leg mount 90. FIG. 6B is a side view of the junction 26, where the bed rail catch portion 98 or pin 98 has been disengaged from the leg mount 90 or leg catch portion 90, where the bed rail 12 has been slightly swung away from the near side of the bed, and where the bed rail catch portion 98 or pin 98 is under tension from the rotating portion of the handle 18. FIG. 6C is a side view of the junction 26, where the bed rail catch portion 98 or pin 98 has been disengaged from the leg mount 90 or leg mount catch portion, where the bed rail 10 has been further swung away from the near side of the bed, and where the bed rail catch portion 98 or pin 98 is no longer under tension from the rotating portion of the handle 18.

FIGS. 7A, 7B, 7C, 7D, 8A, 8B and 8C show the handle 18. Handle 18 includes fixed parts that are fixed relative to tubular sections 30 and 34 of the bed rail frame 20. Handle 18 is engaged to and between ends of tubular sections 34. Handle 18 includes a rotating portion. Handle 18 includes sliding portions.

Handle 18 includes first and second ends 112, 114. These are fixed parts of the handle 18. An end portion of the horizontal segment of tubular section 30 is fixedly engaged in first end 112 of handle 18. And end portion of horizontal tubular section 34 is fixedly engaged in second end 114 of handle 18.

Handle 18 includes an interior tube 116. Handle 18 and interior tube 116 are coaxial. Interior tube 116 is a fixed part of handle 18. Interior tube 116 is cylindrical and intermediate of the handle ends 112, 114. One end of interior tube 116 abuts the end of the horizontal segment of tubular section 30. The other end of interior tube 116 abuts the end of horizontal tubular section 34. Interior tube 116 includes inside and outside diameters about the same as the inside and outside diameters of tubes 30 and 34. Interior tube 116 ties together and fixes apart the handle ends 112, 114. Extending inwardly from first handle end 112 is an annular extension 118. Extending inwardly from second handle end 114 is an annular extension 120. Annular extensions 118, 120 are rigidly fixed to handle ends 112, 114 and are fixed parts of the handle 18. Pins 122 engage openings formed both in the annular extensions 118, 120 and the ends of the interior tube 116 to engage the annular extensions 118, 120 to the ends of the interior tube 116. The inner diameter of the annular extensions 118, 120 are about equal to or slightly greater than the outside diameter of the interior tube 116. Interior tube 116 includes a first pair of diametrically opposed slots 124 and a second pair of diametrically opposed slots 126. Slots 124, 126 run parallel to an axis of the handle 18. The first pair of slots 124 engages a first cam follower or rider 128 and the second pair of slots 126 engages a second cam follower or rider 130. First and second cam followers 128, 130 are pushed to slide from an outer position to an inner position in the slots 124, 126 by a rotating handle portion 132 or cam 132. End portions of the first and second cam followers 128, 130 extend beyond the slots 124, 126 so as to extend beyond the outside diameter of the interior tube 116. Each of the first and second cam followers 128, 130 includes a length that is greater than the outside diameter of the interior tube 116, that is less than the outside diameter of the rotating handle portion 132, and that is about equal to or slightly less than the diameter of the inside cylindrical surface 158, from which the caroming walls rise, of the rotating handle portion 132. Each of the first and second cam followers 128, 130 is a cylindrical peg that can spin relative to the slots 124, 126 while sliding in slots 124, 126 and that can spin relative to the rotating handle portion 132 while being pushed from the outer slot position to the inner slot position or vice versa. The ends of cam followers 128, 130 may be spherical or curved or rounded. The interior ends of the slots 124, 126 are interior stops for the first and second cam followers 128, 130. The outer ends of the slots 124, 126 are outer stops for the first and second cam followers 128, 130. The interior stops or inner slot ends are adjacent to a middle circumferential portion of the interior tube 116. The outer stops or outer slot ends confront the annular extensions 118, 120. Flexible line 68 is engaged to first cam follower 128. Flexible line is engaged to second cam follower 130. Flexible lines 68, 70 are drawn inwardly when the rotating handle portion 132 is positively rotated by a hand of a user to draw the cam followers 128, 130 inwardly. Flexible lines 68, 70 are drawn outwardly by the coil springs 106 returning to their normal contracted nonextended position from their expanded position, which draw the cam followers 128, 130 outwardly, which rotates the rotating handle portion 132 back to an original position.

Rotating handle portion 132 includes first and second half sections 134, 136. The half sections 134, 136 are engaged to each other by pin connectors 138. Each of the half sections 134, 136 includes four pin connectors 138. Pin connectors 138 on one of the half sections 134, 136 may cooperate or engage pin connectors 138 on the other half section 134, 136. Some of the pin connectors 138 may be male connectors. Some of the pin connectors 138 may be female connectors. Pins may be engaged in one or more of the pin connectors 138. Axis of pin connectors 138 on one of the half sections 134, 136 are aligned with axis of adjacent pin connectors 138 on the other of the half sections 134, 136. Half sections 134, 136 may be one or more of welded, glued or pinned together. For example, elongate straight edges 139 may be glued together.

Near each of the ends of each of the half sections 134, 136 is an annular or semi-circular wall 140 disposed at a right angle to a cylindrical outer surface of the rotating handle portion 132. The inner semi-circular face of wall 140 seats up against and rides upon the interior tube 116 when the rotating handle portion 132 is rotated. Interior tube 116 is a fixed convex seat for the rotating concave semi-circular wall 140, which is part of the rotating handle portion 132. Between the semi-circular wall 140 and a respective handle end is a semi-circular face 142 that runs parallel to the cylindrical outer surface of the rotating handle portion 132. Semi-circular face 142 of each of the half sections 134, 136 is spaced from the outside circular face of the annular extensions 118. Semi-circular ends 144, 146 that run at right angles to the outer cylindrical surface of the rotating handle portion 132 abut and slide against inner circular end faces 148, 150 of cylindrical portions 152, 154 of the handle ends 114, 112, respectively. Half sections 134, 136 have respective cylindrical outer surfaces. When half sections 134, 136 are engaged, the rotating handle portion 132 is formed and has a cylindrical outer surface.

Disposed inwardly of each of the four semi-circular walls 140 is a near identical wall 156. Walls 140, 156 run parallel to each other. Each of the walls 140, 156 supports rotation of the rotating handle portion 132 upon the interior tube 116. Interior tube 116 is a seat for each of the walls 140, 156.

Walls 140, 156 extend from inner cylindrical surface 158. There are further walls that extend from inner cylindrical surface 158. These further walls include oblique caroming walls.

The oblique caroming walls form oblique pathways for the end portions of the cam followers 128, 130. Each of the half sections 134, 136 includes two oblique pathways 162, 164.

Figure 7A:
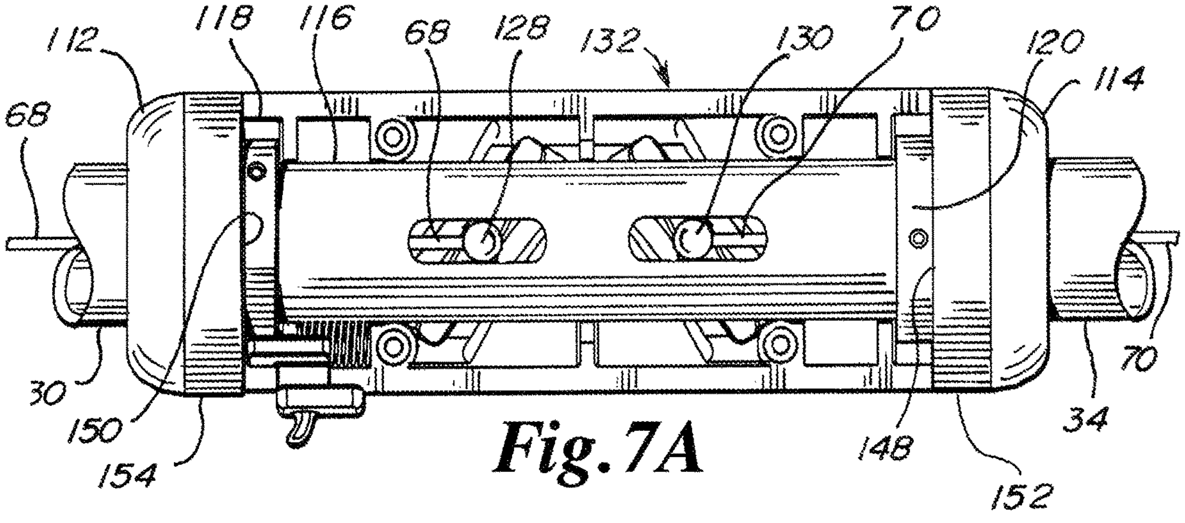
FIG. 7A is a detail side partially cut away view of the handle of the bed rail apparatus of FIG. 1A.
Figure 7B:
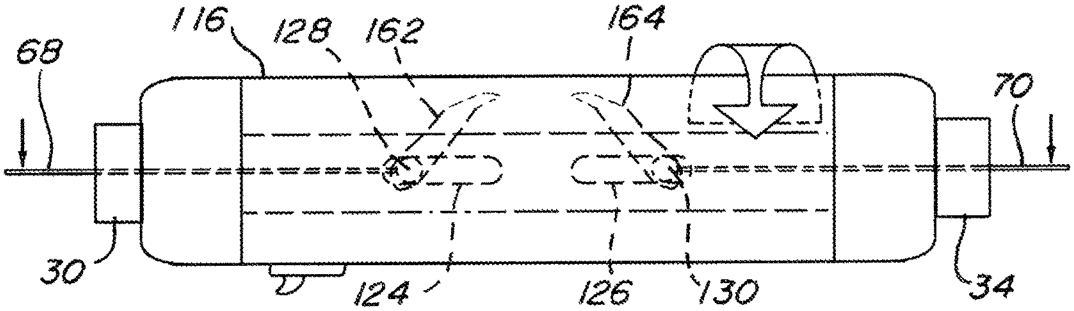
FIG. 7B is a diagrammatic view of the handle of FIG. 7A where the cam has not yet acted upon the cam followers such that the cam followers have not yet drawn in the flexible lines that disengage the bed rail catch portions.
Figure 7C:
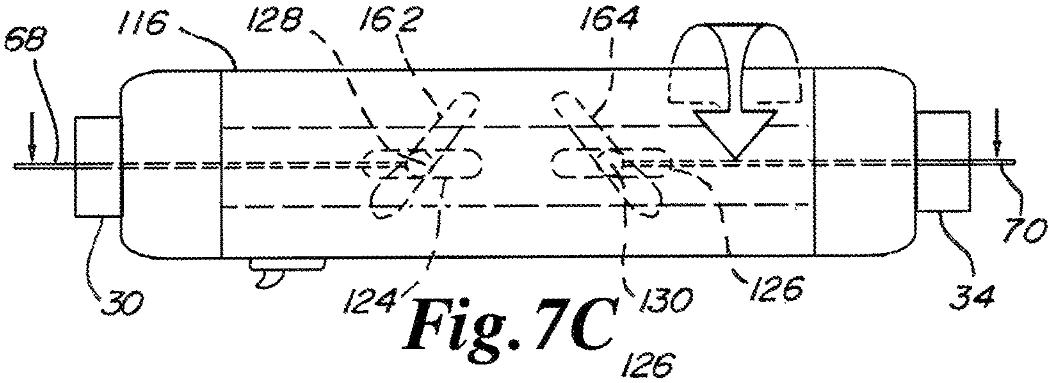
FIG. 7C is a diagrammatic view of the handle of FIG. 7A where the cam is starting to act upon the cam followers to draw in the flexible lines that disengage the bed rail catch portions.
Figure 7D:
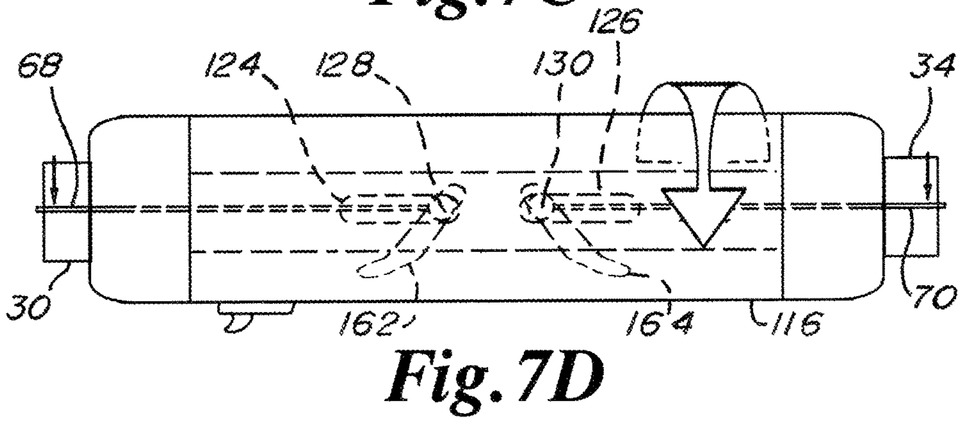
FIG. 7D is a diagrammatic view of the handle of FIG. 7A where the cam has fully acted upon the cam follows to draw in the flexible lines a sufficient distance to disengage the bed rail catch portions.

Oblique pathway or groove segment 162 engages, for the direction of rotation shown in FIGS. 7B, 7C and 7D, first cam follower 128 at its outer end prior to the rotating handle portion 132 beginning its rotation, as shown in FIG. 7B. Likewise, oblique pathway or groove segment 164 engages, for the direction of rotation shown in FIGS. 7B, 7C and 7D, second cam follower 130 at its outer end prior to the rotating handle portion 132 beginning its rotation, as shown in FIG. 7B. As the rotating handle portion 132 continues to rotate in the same direction, and as shown in FIG. 7C, the oblique pathways 162, 164 push the first and second cam followers 128, 130 inwardly in the slots 124, 126 of the interior tube 116 and thus draw the flexible lines 68, 70 inwardly. As the rotating handle portion 132 continues to rotate in the same direction, and as shown in FIG. 7D, the oblique pathways 162, 164 push the first and second cam followers 128, 130 further inwardly to the inner seating ends of the slots 124, 126 of the interior tube 116 thus drawing the flexible lines 68, 70 still further inwardly. By such a point, catch portions of the junctions 26, 28 have disengaged by the drawing in of the distal ends of the flexible lines 68, 70 to permit the bed rail 12 to swing. Oblique pathways 162, 164 are oblique relative to the rotational axis of the rotating handle portion 132. Each of the cam followers 128, 130 engages first and second oblique pathways at the same time, where the first oblique pathway is formed in one half section 134 and where the second oblique pathway is formed in the other half section 136.

Reference number 166 indicates a top edge of an oblique caroming wall forming one side of oblique pathway 162, where the bottom of the wall engages the cylindrical surface 158. Reference number 168 indicates a top edge of an oblique caroming wall forming the other side of oblique pathway 162, where the bottom of the wall engages the cylindrical surface 158. Reference number 170 indicates a side surface of the oblique caroming wall that has top wall edge 166. Reference number 172 indicates a side surface of the oblique caroming wall that has top wall edge 168.

Reference number 174 indicates a top edge of an oblique caroming wall forming one side of oblique pathway 164. Reference number 176 indicates a top edge of an oblique caroming wall forming the other side of oblique pathway 164. Reference number 178 indicates a side surface of the oblique caroming wall that has top wall edge 174. Reference number 180 indicates a side surface of the oblique caroming wall that has top wall edge 176.

Each of the top wall edges 166, 168, 174, 176 is seated on the cylindrical interior tube 116 and helps the top wall edges of walls 140, 156 support the rotating handle portion 132.

Pathway 162 terminates in first and second ends 182, 184. Pathway 164 terminates in first and second ends 186, 188.

Opposing side wall surfaces 170, 172 have middle locations where the wall surfaces 170, 172 are disposed at a right angle relative to interior cylindrical surface 158. Other portions of the wall surfaces 170, 172 are oblique to the interior cylindrical surface 158.

Figure 8A:
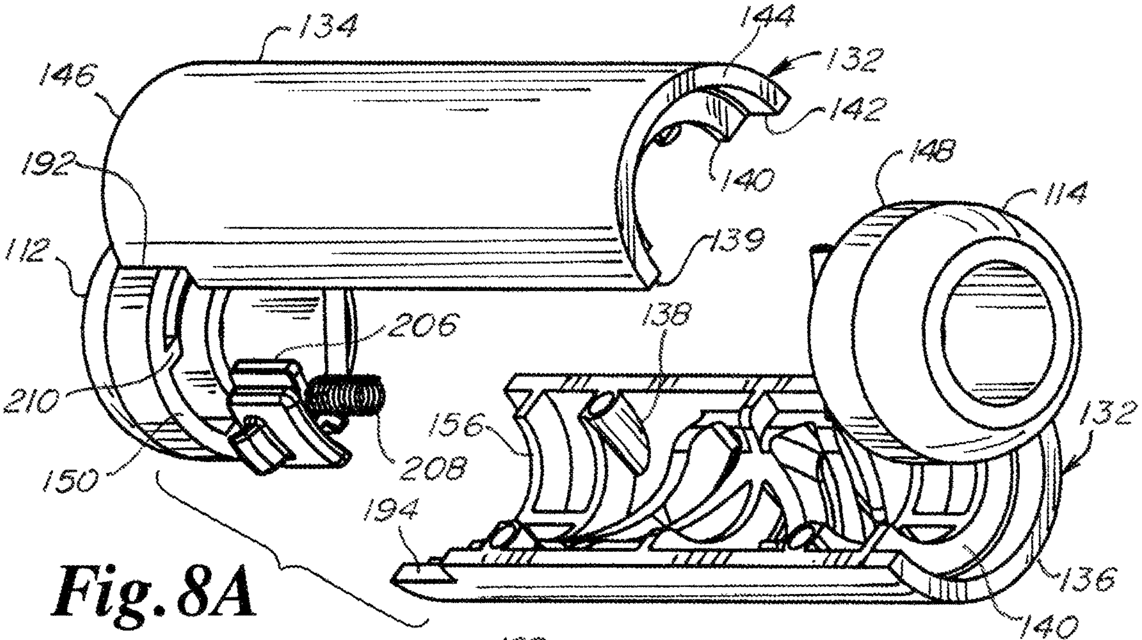
FIG. 8A is a detail broken apart perspective view of portions of the handle of FIG. 7A.
Figure 8B:
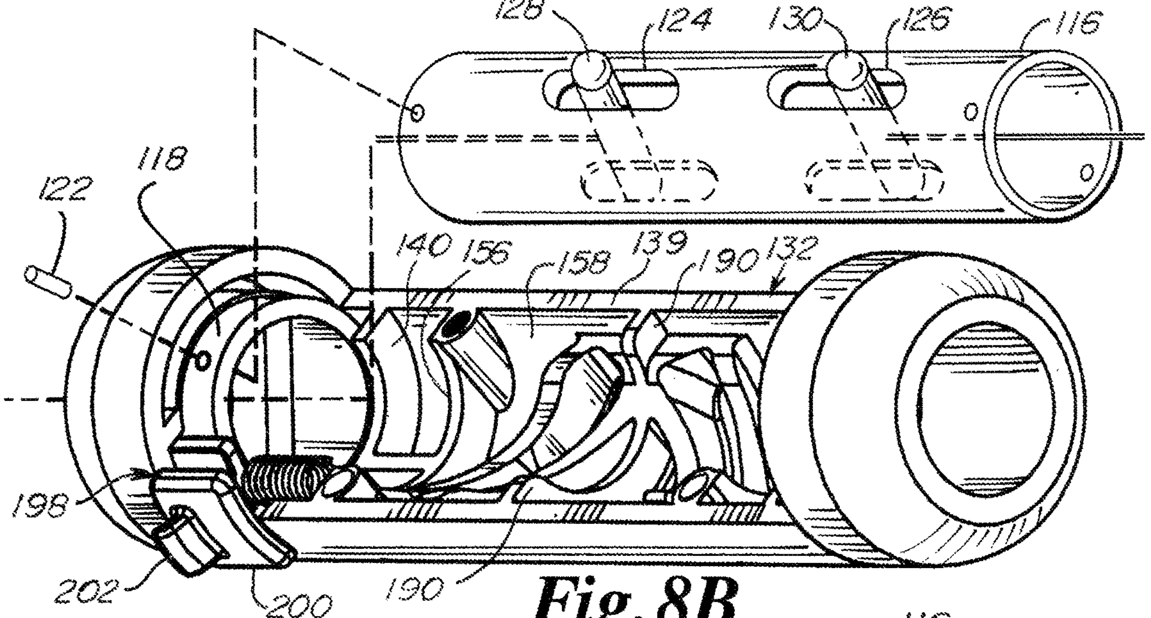
FIG. 8B is a detail partially phantom perspective view of the handle of FIG. 7A.
Figure 8C:
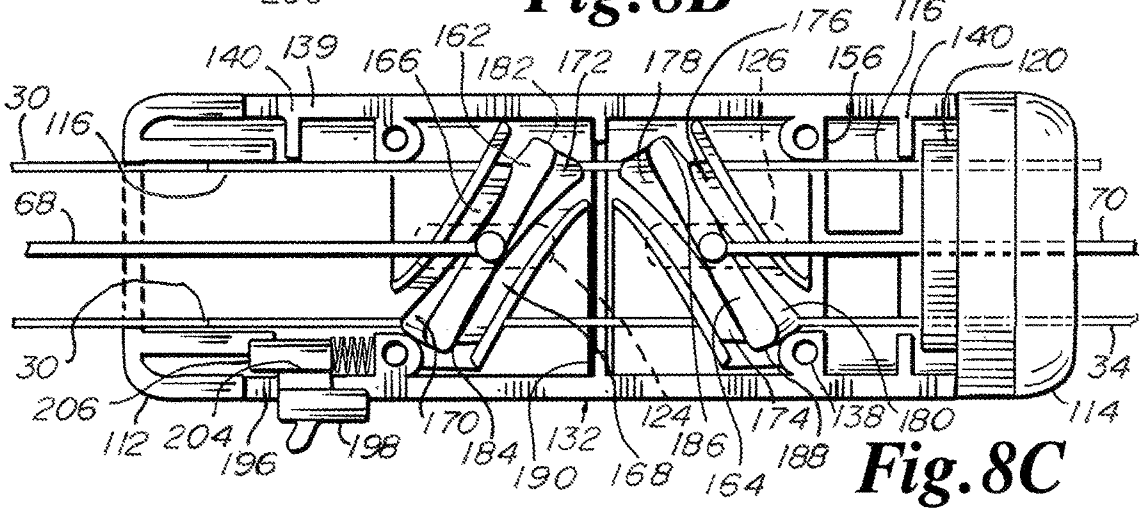
FIG. 8C is a side partially cut away partially phantom view of the handle of FIG. 7A.

As shown in FIG. 8C, wall surface 170 becomes increasingly oblique (increasingly extending away from a right angle) as the wall extends from the middle location (halfway between pathway ends 182, 184) to pathway end 184. This portion of wall surface 170 is about one-fourth of the wall surface making up pathway 162. This portion of wall surface 170 has spaced therefrom a parallel opposing wall surface (half of wall surface 172), with such spacing being about equal to or slightly more than the diameter of cam follower 128. These opposing wall surfaces of oblique pathway 162 thus defined can be referred to as the south portion of oblique pathway 162.

As shown in FIG. 8C, wall surface 172 becomes increasingly oblique (increasingly extending away from a right angle) as the wall extends from the middle location (halfway between pathway ends 182, 184) to pathway end 182. This portion of wall surface 172 is about one-fourth of the wall surface making up pathway 162. This portion of wall surface 172 has spaced therefrom a parallel opposing wall surface (half of wall surface 170), with such spacing being about equal to or slightly more than the diameter of cam follower 128. These opposing wall surfaces of oblique pathway 162 thus defined can be referred to as the north portion of oblique pathway 162.

Opposing side wall surfaces 178, 180 have middle locations where the wall surfaces 178, 180 are disposed at a right angle relative to interior cylindrical surface 158. Other portions of the wall surfaces 178, 180 are oblique to the interior cylindrical surface 158.

As shown in FIG. 8C, wall surface 178 becomes increasingly oblique (increasingly extending away from a right angle) as the wall extends from the middle location (halfway between pathway ends 186, 188) to pathway end 186. This portion of wall surface 178 is about one-fourth of the wall surface making up pathway 164. This portion of wall surface 178 has spaced therefrom a parallel opposing wall surface (half of wall surface 180), with such spacing being about equal to or slightly more than the diameter of cam follower 130. These opposing wall surfaces of oblique pathway 164 thus defined can be referred to as the north portion of oblique pathway 164.

As shown in FIG. 8C, wall surface 180 becomes increasingly oblique (increasingly extending away from a right angle) as the wall extends from the middle location (halfway between pathway ends 186, 188) to pathway end 188. This portion of wall surface 180 is about one-fourth of the wall surface making up pathway 164. This portion of wall surface 180 has spaced therefrom a parallel opposing wall surface (half of wall surface 178), with such spacing being about equal to or slightly more than the diameter of cam follower 130. These opposing wall surfaces of oblique pathway 164 thus defined can be referred to as the south portion of oblique pathway 164.

Each of the oblique pathways 162, 164 can be referred to as a twisting pathway. Each of the south and north portions of each of the oblique pathways 162, 164 is oblique in two ways: 1) each of the south and north portions of oblique pathways 162, 164 is oblique relative to the rotational axis of the rotating handle portion 132, and 2) each of the south and north portions of oblique pathways 162, 164 is oblique relative to the interior cylindrical surface 158. Each of the middle locations of the oblique pathways 162 qualifies as oblique only under the first statement above because at their middle locations the wall surfaces 178, 180 are at right angles to the inner cylindrical surface 158.

In other words, as the cam followers 128, 130 are drawn back and forth in their respective slots 124, 126, the cam followers 128, 130 pivot slightly in a plane defined by the slots 124, 126. The cam followers 128, 130 pivot or rotate in one direction when in the south portions of the oblique pathways 162, 164 and pivot or rotate the other way when in the north portions of oblique pathways 162, 164. Each of the cam followers 128, 130 is at a right angle to the axis of the rotating handle portion 132 at one time and at this time each of the end portions of each of the cam followers 128, 130 is in the middle of its respective slot 124.

It should be noted that each of the half sections 134, 136 have first and second pathways 162, 164 and the associated caroming walls.

Each of the ends of each of the cam followers 128, 130 slides against the inner cylindrical surface 158 of the rotating handle portion 132 such that side to side movement of the cam followers 128, 130 is minimized. The diameter of each of the cam followers 128, 130 is about equal to or slightly less than the width of each of the slots 124, 126 to minimize wobble of the cam followers 128, 130 in the slots 124, 126.

Cam herein generally means the inner surface of the rotating handle portion 132 and more particularly means one or more of the following portions of the inner surface of the rotating handle portion 132, including but not limited to oblique pathway or groove segment 162, oblique pathway or groove segment 164, a wall or caroming wall having one or more of wall top edge 166, wall top edge 168, wall side 170, wall side 172, wall top edge 174, wall top edge 176, wall side 178, and wall side 180, pathway end 182, pathway end 188, and inner cylindrical surface 158. Inner cylindrical surface 158 runs parallel to an exterior surface of the rotating handle portion 132. Each of the caroming walls has a base on the inner cylindrical surface 158. The inner cylindrical surface 158 may contain the ends of the cam followers 128, 132. Although interior tube 116 does not rotate, interior tube 116 and the slots 124, 126 of the interior tube 116 may be defined as part of the cam or caroming surfaces of the rotating handle portion 132. A cam may be conventionally defined as a rotating or sliding piece in a mechanical linkage used for transforming rotary motion into linear motion or for transforming linear motion into rotary motion.

Each of the half sections 134, 136 includes a central wall 190, the top edge thereof being seated upon the interior tube 116. Central wall 190 runs at a right angle to the axis of the handle 18, as do walls 140 and 156.

Half section 134 includes a corner cut out 192 and half section 136 includes a corner cut out 194. The cut outs 192, 194 confront each other when the half sections 134, 136 are joined to form the rotating handle portion 132. The cut outs form a slot 196 for sliding engagement of a sliding thumb lock 198.

Thumb lock 198 includes a base 200 that has an inner surface that is curved to conform to the exterior cylindrical surface of the rotating handle portion 132. An extension 202 protrudes from the outer surface of the base 200 to be engaged by a thumb or finger for sliding the thumb lock 198 inwardly from a locked position to an open position.

Thumb lock 198 includes an intermediate piece 204 that passes through slot 196 and an interior lock piece 206 disposed on the inside of the rotating handle portion 132. Interior lock piece 206 and base 200 are joined by the intermediate piece. Extension 202, base 200, intermediate piece 204 and interior lock piece 206 are integral and one-piece.

Intermediate piece 204 has a width about equal to or slightly less than the width of slot 196 such that piece 204 and the thumb lock 198 as a whole does not travel in the circumferential direction.

Intermediate piece 204 has a length that is less than the length of slot 196 such that intermediate piece 204 and the thumb lock 198 can slide in the axial direction of the handle 18.

Lock piece 206 in disposed in the radial direction between first annular extension 118 and the inner cylindrical surface of cylindrical portion 154 of the first handle end 112. Lock piece 206 further is disposed between the interior tube 116 and the inner cylindrical surface 158 of the rotating handle portion 132. Annular extension 118 provides a sliding surface for the lock piece 206. A coil spring 208 is disposed between the inner end of the lock piece 206 and wall 140. Coil spring 208 keeps lock piece 206 in a normally locked position, where an inwardly projecting stop 210 depends radially from the inner surface of the cylindrical portion 154 of the first handle end 112. When the thumb lock 198 is pushed inwardly, the lock piece 206 is pushed inwardly such that an outer edge of the lock piece 206 clears an inner edge of the stop 210, whereupon the lock piece 206 may travel circumferentially on the first annular extension 118 and whereupon the rotating handle portion 132 may rotate on the interior tube 116. After the cam followers 128, 130 act as stops and stop the rotation of the rotating handle portion 132 and after the catch portions of the junctions 26, 28 have been disengaged, the rotating handle portion 132 may be released, whereupon the flexible lines 68, 70 are drawn back by the coil springs 106 of the junctions 26, 28, whereupon the cam followers 128, 130 draw the rotating handle portion 132 to rotate back, whereupon the lock piece 206 slides radially past stop 210 and is snapped axially back into the normal position by coil spring 208, whereupon the lock piece 206 and the thumb lock 198 as a whole is prevented from rotation by the stop 210.

In operation, the bed rail apparatus 10 is unfolded once or twice, depending upon whether the stored bed rail apparatus has been folded along one or both of the horizontal and vertical fold lines, as described above. Then the connectors 24 are engaged so as to form a rigid bed rail frame 20. Then the legs 14, 16 are positioned between the mattress and mattress support. Then the counter member 74 is positioned to engage the far sides of the mattress and mattress support and then the counter member 74 is tightened by using the strap 72 and pincher apparatus 80. After the child climbs into bed, the caregiver swings the bed rail 12 up to an operating position at the near side of the bed by holding the handle 18 and swinging up the bed rail through angular positions F, E, D, C, B and A shown in FIG. 4C. At about position B, the pins 98 of the junctions 26, 28 will be pushed upwardly by oblique surfaces 110 of the leg mounts 90 and then will snap into the seats 96, thereby snapping the bed rail 12 back into its original operating position where it is disposed at an upright acute angular position relative to the legs 14, 16.

In operation to swing down the bed rail 12 from where the bed rail 12 is in an upright position confronting the near side of the bed, where the bed rail frame 20 is disposed at an acute angle relative to the first and second legs 14, 16, the rotating handle portion 132 is grasped such that the thumb is on the thumb lock 198. Then the thumb lock 198 is slid axially inwardly by the thumb to slide the lock piece 206 axially inwardly by the stop 210, whereupon the rotating handle portion 132 may be rotated. As the handle portion 132 is rotated, the caroming pathways 162, 164 push the cam followers 128, 130 axially inwardly in the axial slots 124, 126 of the interior tube 116. As the cam followers 128, 130 are pushed inwardly, the cam followers 128, 130 draw the flexible lines 68, 70 inwardly, which draws pins 98 out of the seats 96 of leg mount 90, thereby permitting the user to draw the handle 18 back away from the near side of the bed so as to swing the bed rail 12 downwardly, such as to position F shown in FIG. 4C. Thus, with one hand, the user may 1) slide the thumb lock 198, 2) rotate the rotating handle portion 132 to disengage the pins 98 from the leg mounts 90, and 3) draw back and swing down the bed rail 12. This leaves the other hand of the user to hold the child away from the edge of the bed. When the user releases the rotating handle portion 132, the coil springs 106 of the junctions 26, 28 draw out the flexible lines 68, which draw out the cam followers 128, 130 with interior tube slots 124, 126 acting as guides. As the cam followers 128, 130 are drawn outwardly axially, the cam followers 128, 130 push the rotating handle portion 132 back to its original position. As the rotating handle portion 132 rotates back to its original position, the locking piece 206 is slid circumferentially past the stop 210 and snaps axially back into its locked position to lock the bed rail 12 in position against the near side of the bed.

Figure 9A:
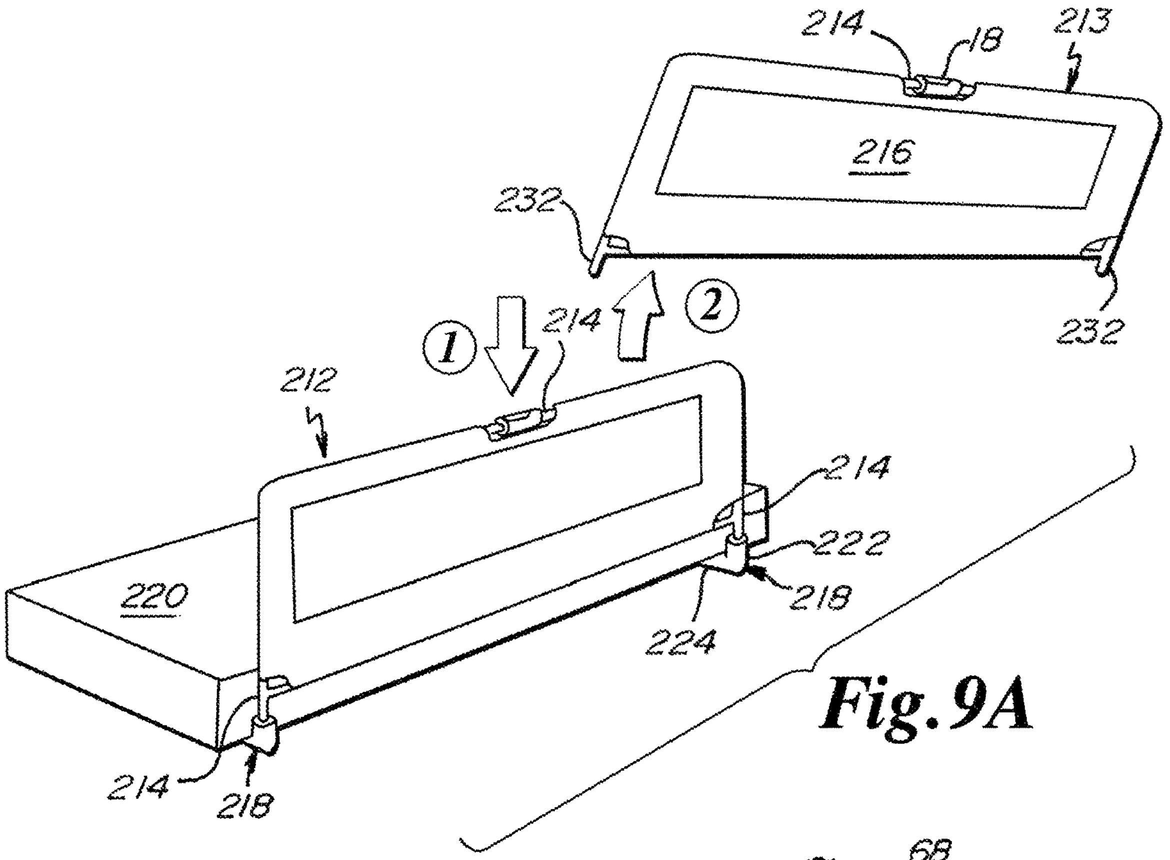
FIG. 9A is a perspective diagrammatic view of an alternate embodiment of the one hand two point release bed rail apparatus of FIG. 1A, where the bed rail is wholly separable from the leg mount of the bed rail apparatus.
Figure 9B:
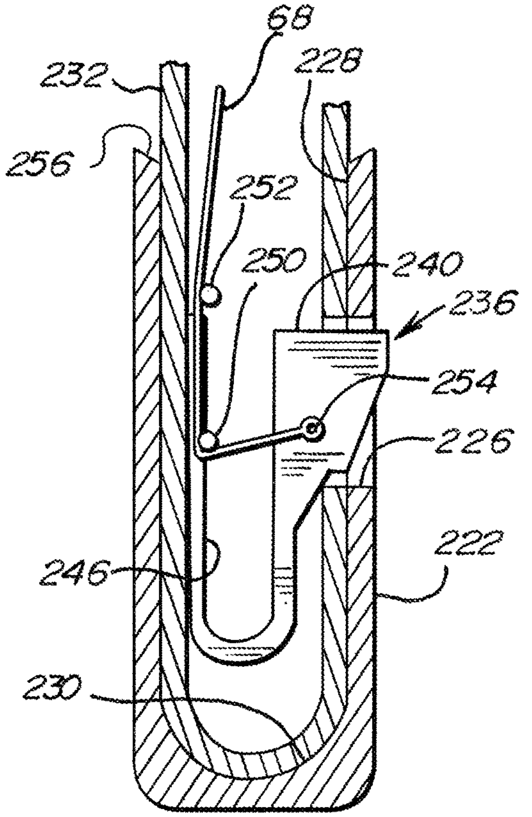
FIG. 9B is a section diagrammatic view of a bed rail catch portion of the bed rail apparatus of FIG. 9A engaged to the leg mount catch portion.
Figure 9C:
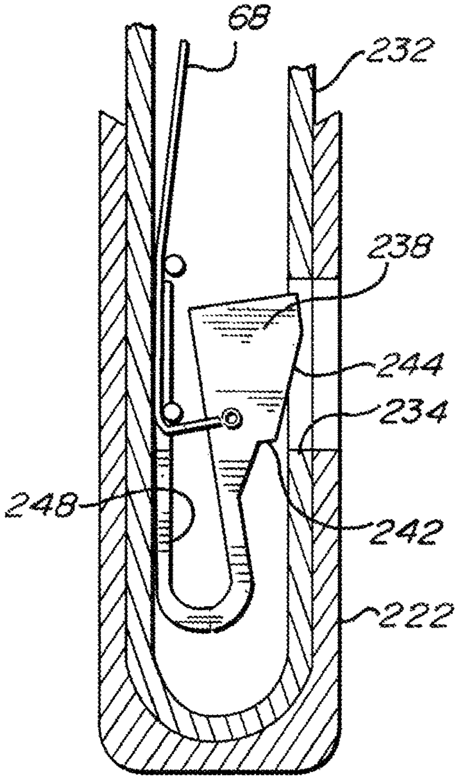
FIG. 9C is a section diagrammatic view of the bed rail catch portion of FIG. 9B drawn in by the handle of the bed rail apparatus such that the bed rail may be wholly separated from the leg mount of the bed rail apparatus.

In an alternate embodiment shown in FIGS. 9A, 9B and 9C, a bed rail apparatus 212 includes a bed rail 213 having a bed rail frame 214 and sheeting 216. Bed rail apparatus 212 further includes legs 218. Bed rail frame 214 includes handle 18. Legs 218 may extend under a mattress 220 and be engaged to the mattress by employing a strap 72, counter member 74 and pincher mechanism 80, and by leg mount 222 acting as a second counter member such that mattress 220 is sandwiched between first counter member 74 on the far side of the mattress 220 and second counter member or leg mount 222 on the near side of the mattress 220.

In the bed rail apparatus 10, the handle 18 is offset, such as offset from the vertical fold line once the three horizontally extending connectors 24 are disengaged. In bed rail apparatus 212, handle 18 is set equidistance between the two vertically extending side rail portions.

Legs 218 include respective leg mounts 222 that are disposed at an acute angle relative to respective straight leg portions 224 such that the bed rail frame 214 defines a first plane that lies at an acute angle relative to a second plane defined by the straight leg portions 224 of both legs 218.

Each of the leg mounts 222 includes a button opening 226. Each of the leg mounts 222 includes a bed rail portion receptor that includes an elongate cylindrical inner sidewall surface 228 and a spherical inner surface 230.

Bed rail frame 214 includes side rail tubular lowermost portions 232. Tubular lowermost portions 232 are insertable with a slideable friction fit into leg mounts 222. Tubular lowermost portions 232 have an outer cylindrical surface with a diameter about equal to or slightly less than cylindrical surface 228 of the leg mounts 222. Tubular lowermost portions 232 have a spherical distal lowermost end that is seated in spherical surface 230 of the legs mounts 222. Side rail lowermost portions 232 include a button opening 234 that is coaxial with button opening 226 of leg mount 222 when the spherical distal end of the rail portions 232 are seated on the spherical surface 230 of the leg mount 222. Buttons 226, 234 may be circular and of the same diameter.

One directional buttons 236 are engaged in the lowermost rail portions 232 and are operated by one of the flexible lines 68, 70. Button 236 includes a head 238 having a first straight stop 240 that extends into and through both button openings 226, 234 and a second straight stop 242 that extends into only button opening 234. Head 238 further includes an oblique outside surface 244 that is oblique relative to each of the first and second straight stops 240, 242 and that is further oblique relative to an axis of lowermost rail portion 232.

One directional button 236 further includes a U-shaped base 246. U-shaped base 246 is a resilient piece. U-shaped base 246 is a spring. U-shaped base 246 includes an elongate portion 248 that is fixed to the interior surface of lowermost rail portion 232.

Lowermost rail portion 232 includes first and second pins 250, 252 engaged between sections of the cylindrical wall of lowermost rail portion 232. Pin 250 is a lower pin. Pin 252 is an upper pin. Pins 250, 252 are spaced apart. Head 238 includes a third pin 254. Flexible line 68 extends on one side of pin 252, on one side of pin 250, and then a distal end of flexible line 68 is engaged to third pin 254 of head 254.

In operation, a drawing in of the flexible line 68, such as by rotating the rotating handle portion 132 draws in head 238 such that all parts of button head 238 are disposed inwardly of cylindrical surface 228 of leg mount 222 such that lowermost rail portion 232 can be lifted out of leg mount 222. The other leg mount 222 includes flexible line such that each of the lowermost rail portions 232 can be disengaged from their respective leg mounts 222 at the same time when the rotating handle portion 132 is rotated. Thus the bed rail 213 having the bed rail 214 and sheeting 216 can be quickly and entirely in one whole piece disengaged from leg mounts 222.

When lowermost leg portions 232 are reinserted into the leg mounts 222, the distal ends of the lowermost rail portions 232 are guided into the leg mounts 222 by the beveled edges 256 at the proximal openings of the leg mounts 222. Annular beveled edges 256 extend inwardly and downwardly. As the distal ends of the lowermost rail portions 232 are fed further into the leg mounts 222, the oblique surfaces 244 hit the beveled edges 256, whereupon the heads 238 are pushed inwardly so as to allow the leg mounts 222 to accept the lowermost rail portions 232. As the distal ends of the lowermost rail portions 232 are fed still further inwardly into the leg mounts 222, button head 238 snaps out of button opening 226 at about the same time that the spherical distal end of lowermost rail portion 232 is seated on the spherical surface 230 of the leg mount 222. If an attempt is then made to take out the bed rail frame 214 without rotating the rotating handle portion 132, a bottom portion of the edge forming button opening 234 of lowermost rail portion 232 hits straight stop 242 of the button head 238, whereupon the upper straight button stop 240 hits an upper portion of the edge forming button opening 226 of the leg mount 222 such that lowermost rail portion 232 is prevented from being further lifted.

As to the one directional button 236, the Flannery et al. U.S. Pat. No. 7,302,720 B2 issued on Dec. 4, 2007 and entitled One Direction Button Mechanism is hereby incorporated by reference in its entirety.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A one hand two point release bed rail apparatus for engagement to a bed, the bed having a mattress and mattress support, comprising:

a) a bed rail, the bed rail being positioned adjacent to a side of the bed, the bed rail having a frame, the frame having first and second portions;

b) first and second legs between the mattress and mattress support;

c) first and second catches respectively between the first and second legs and the bed rail, the first and second catches respectively engaging the first and second legs to the bed rail at respective first and second locations;

d) a handle having first and second ends, the first end of the handle being engaged to the first portion of the frame of the bed rail, the first portion of the frame of the bed rail running from the first end of the handle to the first location, the second end of the handle being engaged to the second portion of the frame of the bed rail, the second portion of the frame of the bed rail running from the second end of the handle to the second location;

e) the first end of the handle including a first cam follower that is operatively connected to the first catch such that operation of the first end of the handle disengages the first catch to disengage the bed rail from the first leg;

f) the second end of the handle including a second cam follower that is operatively connected to the second catch such that operation of the second end of the handle disengages the second catch to disengage the bed rail from the second leg;

g) wherein the bed rail is swingably engaged to the first and second legs, and wherein disengagement of the first and second catches permits the bed rail to swing and remain engaged to the first and second legs; and h) wherein the handle further includes:

i) a cam, the cam being engaged to a rotating portion of the handle; and ii) the cam including the first and second cam followers, the first and second cam followers engaging the cam;

iii) such that rotation of the rotating portion of the handle rotates the cam, which draws in the first and second cam followers, which are operatively connected to the first and second catches, respectively, to disengage the first and second catches between the bed rail and the first and second legs.

2. A one hand two point release bed rail apparatus for engagement to a bed, the bed having a mattress and mattress support, comprising:

a) a bed rail, the bed rail being positioned adjacent to a side of the bed, the bed rail having a frame, the frame having first and second portions;

b) first and second legs between the mattress and mattress support;

c) first and second catches respectively between the first and second legs and the bed rail, the first and second catches respectively engaging the first and second legs to the bed rail at respective first and second locations;

d) a handle having first and second ends, the first end of the handle being engaged to the first portion of the frame of the bed rail, the first portion of the frame of the bed rail running from the first end of the handle to the first location, the second end of the handle being engaged to the second portion of the frame of the bed rail, the second portion of the frame of the bed rail running from the second end of the handle to the second location;

e) the first end of the handle including a first cam follower that is operatively connected to the first catch such that operation of the first end of the handle disengages the first catch to disengage the bed rail from the first leg;

f) the second end of the handle including a second cam follower that is operatively connected to the second catch such that operation of the second end of the handle disengages the second catch to disengage the bed rail from the second leg;

g) wherein the bed rail is disengageable as a whole separate piece from the first and second legs, and wherein disengagement of the first and second catches permits the bed rail to be disengaged as said whole separate piece from the first and second legs;

h) wherein the handle further includes:

i) a cam, the cam being engaged to a rotating portion of the handle; and ii) the cam including the first and second cam followers, the first and second cam followers engaging the cam;

iii) such that rotation of the rotating portion of the handle rotates the cam, which draws in the first and second cam followers, which are operatively connected to the first and second catches, respectively, to disengage the first and second catches between the bed rail and the first and second legs.

3. A method for disengaging first and second catches between a bed rail and first and second legs, the first and second catches, the bed rail, and the first and second legs being part of a one hand two point release bed rail apparatus that may be engaged to a bed, the bed having a mattress and mattress support, the bed rail being positioned adjacent to a side of the bed, the bed rail having a frame, the frame having first and second portions, the first and second legs being between the mattress and mattress support, the one hand two point release bed rail apparatus including the first and second catches, the first and second catches being respectively between the first and second legs and the bed rail, the first and second catches respectively engaging the first and second legs to the bed rail at respective first and second locations, the one hand two point release bed rail apparatus including a handle having first and second ends, the first end of the handle being engaged to the first portion of the frame of the bed rail, the first portion of the frame of the bed rail running from the first end of the handle to the first location, the second end of the handle being engaged to the second portion of the frame of the bed rail, the second portion of the frame of the bed rail running from the second end of the handle to the second location, the first end of the handle including a first cam follower, the second end of the handle including a second cam follower, the first cam follower being operatively connected to the first catch such that operation of the first end of the handle disengages the first catch to disengage the bed rail from the first leg, the second cam follower being operatively connected to the second catch such that operation of the second end of the handle disengages the second catch to disengage the bed rail from the second leg, the handle further including a cam, the cam being engaged to a rotating portion of the handle and the cam including the first and second cam followers, the first and second cam followers engaging the cam, wherein the method comprises the step of:

a) rotating the rotating portion of the handle to rotate the cam, which draws in the first and second cam followers, which operate the first and second catches, respectively, to disengage the first and second catches between the bed rail and the first and second legs.

4. The method of claim 3, and further comprising the step of completely disengaging the bed rail from the first and second legs when the first and second catches are disengaged between the bed rail and first and second legs.

5. The method of claim 3, and further comprising the step of keeping the bed rail engaged to the first and second legs when the first and second catches are disengaged between the bed rail and first and second legs, the bed rail being swingable relative to the first and second legs when the first and second catches are disengaged between the bed rail and the first and second legs.

* * * * *